United States Patent
Ma et al.

(10) Patent No.: US 12,505,362 B2
(45) Date of Patent: Dec. 23, 2025

(54) MODEL SELECTION FOR SPLIT INFERENCE

(71) Applicant: QUALCOMM Incorporated, San Diego, CA (US)

(72) Inventors: Liangping Ma, San Diego, CA (US); Shuai Zhang, San Diego, CA (US); Yingyong Qi, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 51 days.

(21) Appl. No.: 18/659,158

(22) Filed: May 9, 2024

(65) Prior Publication Data

US 2025/0348763 A1   Nov. 13, 2025

(51) Int. Cl.
*G06N 5/04*   (2023.01)
*H04L 67/10*   (2022.01)
*H04W 28/06*   (2009.01)
*G06F 9/48*   (2006.01)

(52) U.S. Cl.
CPC .............. *G06N 5/04* (2013.01); *H04L 67/10* (2013.01); *H04W 28/06* (2013.01); *G06F 9/4806* (2013.01)

(58) Field of Classification Search
None
See application file for complete search history.

(56) References Cited

U.S. PATENT DOCUMENTS

| | | | |
|---|---|---|---|
| 10,984,560 B1 * | 4/2021 | Appalaraju | G06V 10/82 |
| 2021/0004677 A1 * | 1/2021 | Menick | G06N 20/20 |
| 2023/0350936 A1 * | 11/2023 | Alayrac | G06F 16/432 |
| 2024/0104785 A1 * | 3/2024 | Nash | G06T 7/73 |
| 2024/0424398 A1 * | 12/2024 | Kumar | A63F 13/67 |

* cited by examiner

*Primary Examiner* — Quang N Nguyen
(74) *Attorney, Agent, or Firm* — Harrity & Harrity, LLP

(57) ABSTRACT

Systems, methods, and devices for split inference for a task network split between two communication devices. Model parameters for each of the two task network portions may be determined based on a number of factors including the encoding/decoding configuration used for communicating the intermediated representations across the network, and/or the model performance based on network conditions or the encoding/decoding configuration. In some embodiments the transmitting device determines performance changes and/or model parameters and indicates to the receiving device. In some embodiments, the receiving device determines performance changes and/or model parameters and indicates to the transmitting device.

20 Claims, 15 Drawing Sheets

MODEL SELECTION FOR SPLIT INFERENCE

TECHNICAL FIELD

This application relates to wireless communication systems, and more particularly to methods—and associated devices and systems—related to model selection for split inference.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

To meet the growing demands for expanded mobile broadband connectivity, wireless communication technologies are advancing from the long term evolution (LTE) technology to a next generation new radio (NR) technology, which may be referred to as 5th Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHZ to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

In a communication network, devices may perform certain aspects may be implemented, at least in part, using an artificial intelligence (AI) program, such as a program that includes a machine learning (ML) or artificial neural network (ANN) model. An ML model may by split across multiple devices in the network (i.e. split inference). In split inference, intermediate representations may be communicated over the network. Existing split inference systems do not adequately compensate, however, for dynamic network conditions and/or changing requirements.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

The present disclosure describes schemes and mechanisms for model selection for split inference. For instance, split inference may be performed over two devices on a network (wireless or wired), a transmitter performing part 1 of the task network and a receiver performing part 2 of the task network. The intermediate representation generated by part 1 of the task network may be encoded by an encoder on the transmitter and sent over the network to the receiver. The receiver may decode the encoded intermediate representation and complete the inference using part 2 of the task network. Part 1 of the task network may have several versions and each version may be called a model of part 1. Part 2 of the task network may have several versions and each version may be called a model of part 2.

In some aspects, the transmitter may determine a distortion level of the intermediate representation and/or a change in task performance. The transmitter may indicate the distortion and/or task performance information to the receiver such that the receiver may select an appropriate model to use in inference. In some aspects, the transmitter selects the model based on the distortion and/or task performance and indicates the model to the receiver. The transmitter may also update and indicate the split point (e.g., in the case of AlexNet) or split points (e.g., in the case of a feature pyramid network) of the task network (i.e., the layers of the task network to be performed by each of the devices) to the receiver.

In some aspects, the receiver may determine a predicted distortion level and/or a predicted task performance based on test data. The receiver may indicate the distortion and/or task performance information to the transmitter such that the transmitter may select an appropriate model to use in inference. In some aspects, the receiver selects the model based on the distortion and/or task performance and indicates the model to the transmitter. The receiver may also update and indicate the split point or split points of the task network (i.e., the layers of the task network to be performed by each of the devices) to the transmitter.

In some aspects, the transmitter and/or receiver may determine which model to use for their respective parts of the task network based on the encoder configuration and/or decoder configuration. The transmitter may indicate encoder configuration information to the receiver. The receiver may indicate decoder configuration information to the transmitter. The encoder and/or decoder configuration may be based on information about the distortions, a change in task performance, a complexity for the encoder/decoder configuration, network conditions, performance requirements, etc.

In an aspect of the disclosure, a method of communication performed by a first communication device includes: generating, via a first part of a task network, an intermediate representation of an input; generating, via an encoder configured with an encoder configuration, a compressed representation of the intermediate representation; transmitting, to a second communication device, the compressed representation; and transmitting, to the second communication device based on the encoder configuration, an indication for selecting a set of parameters for a second part of the task network for generating an output based on the compressed representation.

In another aspect of the present disclosure, a method of communication performed by a first communication device comprises: transmitting, to a second communication device, a signal based on a predetermined testing representation; receiving, from the second communication device, an indication for parameter selection based on the predetermined testing representation; generating, via a first task network with a set of parameters selected based on the indication, an intermediate representation of an input; generating, via an encoder configured with an encoder configuration, a compressed representation of the intermediate representation; and transmitting, to the second communication device, the compressed representation.

In another aspect of the present disclosure, a method of communication performed by a first communication device comprises: configuring an encoder with an encoder configuration; selecting a set of parameters for a first task network based on at least one of: the encoder configuration, or a decoder configuration associated with a second communication device; generating, via the first task network with the selected set of parameters, an intermediate representation of an input; generating, via the encoder, a compressed representation of the intermediate representation; and transmitting, to the second communication device, the compressed representation.

Other aspects and features of the present invention will become apparent to those of ordinary skill in the art, upon reviewing the following description of specific, exemplary aspects of the present invention in conjunction with the accompanying figures. While features of the present invention may be discussed relative to certain aspects and figures below, all aspects of the present invention can include one or more of the advantageous features discussed herein. In other words, while one or more aspects may be discussed as having certain advantageous features, one or more of such features may also be used in accordance with the various aspects of the invention discussed herein. In similar fashion, while exemplary aspects may be discussed below as device, system, or method aspects, it should be understood that such exemplary aspects can be implemented in various devices, systems, and methods.

DETAILED DESCRIPTION

Figure 1:
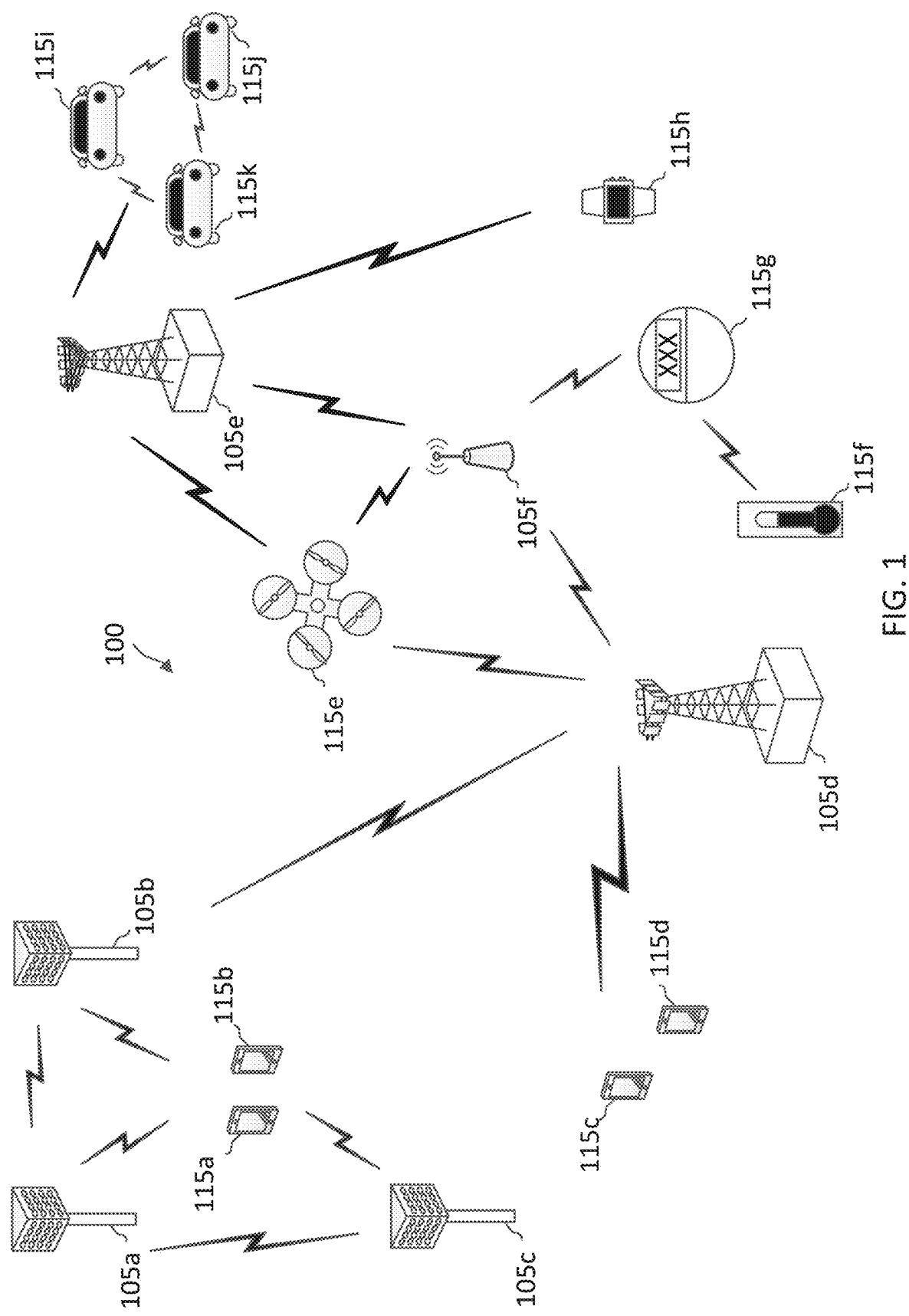
FIG. 1 illustrates a wireless communication network according to one or more aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some aspects, well-known structures and components are shown in block diagram form in order to avoid obscuring such concepts.

This disclosure relates generally to wireless communications systems, also referred to as wireless communication networks. In various aspects, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, 5th Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For instance, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an Ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~ 1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For instance, in various outdoor and macro coverage deployments of less than 3 GHz FDD/TDD implementations, subcarrier spacing may occur with 15 kHz, for instance over 5, 10, 20 MHz, and the like bandwidth (BW). For other various outdoor and small cell coverage deployments of TDD greater than 3 GHZ, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QOS) requirements. For instance, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink (UL)/downlink (DL) scheduling information, data, and acknowledgement in the same subframe. The self-contained integrated subframe supports communications in unlicensed or contention-based shared spectrum, adaptive UL/DL that may be flexibly configured on a per-cell basis to dynamically switch between UL and DL to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For instance, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For instance, a method may be implemented as part of a system, device, apparatus, and/or as instructions stored on a computer readable medium for execution on a processor or computer. Furthermore, an aspect may comprise at least one element of a claim.

Certain aspects and techniques as described herein may be implemented, at least in part, using one or more task networks, that may include multiple processing steps whose functionality may be altered by altering parameters of the task networks. For example a task network may include an artificial intelligence (AI) program, such as a program that includes a machine learning (ML) or artificial neural network (ANN) model. An example ML model may include mathematical representations or define computing capabilities for making inferences from input data based on patterns or relationships identified in the input data. As used herein, the term "inferences" can include one or more of decisions, predictions, determinations, or values, which may represent outputs of the ML model. The computing capabilities may be defined in terms of certain parameters of the ML model, such as weights and biases. Weights may indicate relationships between certain input data and certain outputs and intermediate representations of the ML model, and biases are offsets which may indicate a starting point for outputs and intermediate representations of the ML model. An example ML model operating on input data may start at an initial output based on the biases and then update its output based on a combination of the input data and the weights.

In some aspects, an ML model may be configured to provide computing capabilities for wireless or wired communications. Such an ML model may be configured with weights and biases to perform audio processing, video processing, or other functionality. Thus, during operation of a device, the ML model may receive input data (such as a raw video input) and make inferences (such as modifications to the raw video input including color correction, object manipulation, image segmentation etc.) based on the weights and biases.

ML models may be deployed in one or more devices (for example, network entities and user equipments (UEs)) and may be configured to enhance various aspects of a wireless communication system. For example, an ML model may be trained to identify patterns or relationships in data corresponding to a network, a device, an air interface, or the like. An ML model may support operational decisions relating to one or more aspects associated with wireless communications devices, networks, or services. For example, an ML model may be utilized for supporting or improving aspects such as signal coding/decoding, network routing, energy conservation, transceiver circuitry controls, frequency synchronization, timing synchronization, channel state estimation, channel equalization, channel state feedback, modulation, demodulation, device positioning, beamforming, load balancing, operations and management functions, security, etc.

ML models may be characterized in terms of types of learning that generate specific types of learned models that perform specific types of tasks. For example, different types of machine learning include supervised learning, unsupervised learning, semi-supervised learning, reinforcement learning, etc. ML models may be used to perform different tasks such as classification or regression, where classification refers to determining one or more discrete output values from a set of predefined output values, and regression refers to determining continuous values which are not bounded by predefined output values. Some example ML models configured for performing such tasks include ANNs such as convolutional neural networks (CNNs) and recurrent neural networks (RNNs), transformers, diffusion models, regression analysis models (such as statistical models), large language models (LLMs), decision tree learning (such as predictive models), support vector networks (SVMs), and probabilistic graphical models (such as a Bayesian network), etc.

The description herein illustrates, by way of some examples, how one or more tasks or problems in communications may benefit from the application of one or more ML models. To facilitate the discussion, an ML model configured using an ANN is used, but it should be understood, that other types of task networks may be used instead of an ANN. Hence, unless expressly recited, subject matter regarding task networks or ML models is not necessarily intended to be limited to an ANN solution. Further, it should be understood that, unless otherwise specifically stated, terms such "AI/ML model," "ML model," "trained ML model," "ANN," "model," "algorithm," or the like are intended to be interchangeable.

An ML model may be split across multiple devices in a network. For example, a first portion of the layers of an ML model (i.e., part 1) may be used for inference by a first device generating an intermediate representation (e.g., an activation, feature map, intermediate data, etc.). The intermediate representation, or an encoded version, may be communicated over the network. A receiving device may decode the received intermediate representation as necessary and perform the remaining inference with the remaining portion of the layers of the ML model (i.e., part 2) to generate a final output. This general structure may be referred to as split inference.

The present disclosure describes schemes and mechanisms for model selection for split inference. Model selection may include selection of model parameters and/or the portion of the ML model that is performed by each device over which inference is split. Due to dynamic network conditions, the encoder used to encode the intermediate representation may need to be changed to adapt the bitrate of the representations to the capacity of the network. For example, an encoder may be configured with variable feature reduction, quantization, and/or compression. To keep good inference performance, the task network (part 1, part 2, or both) may need to be retrained based on the encoder configuration, the distortion in reconstructing the activation, or other reasons. In some aspects, a number of different optional models may be pre-trained, and one of the pre-trained models (sets of parameters) may be selected based on the conditions.

Switching between models may be implemented in a number of ways. In some aspects, a hardware switching mechanism may be utilized wherein the model is implemented in hardware, and switching may include switching which portion of the hardware is connected at a given time. In some aspects the model is implemented in software. The hardware running the software (e.g., GPU, NPU) may be shared among multiple tasks. In some aspects, the software may automatically unload the model when a task (e.g., segment an image) is finished. In some aspects, the software may only unload a model as needed in order to reduce model switching cost (e.g., power, delay).

In some cases, one of the two parts (part 1, part 2) of the task network/ML model is too large so it may be impractical to re-train the large part and/or store multiple models for the part. The other part may, however, be small enough to make retraining and/or having multiple sets of parameters in memory feasible. In this case, only the smaller of the two parts may be switched as described herein. In some cases, the smaller portion may be on the receiving end, where the receiving end is a user device, and may include user-specific parameters.

In some specific implementations, split inference is performed over two devices on a network, a transmitter and a receiver, with the intermediate representations encoded by the transmitter and decoded by the receiver.

In some aspects, the transmitter may determine a distortion level of the intermediate representation and/or a change in task performance. The transmitter may indicate the distortion and/or task performance information to the receiver such that the receiver may select an appropriate model to use in inference. In some aspects, the transmitter selects the model based on the distortion and/or task performance and indicates the model to the receiver. The transmitter may also indicate the split point or split points of the task network (i.e., the layers of the task network to be performed by each of the devices) to the receiver.

In some aspects, the receiver may determine a predicted distortion level and/or a predicted task performance based on test data. The receiver may indicate the distortion and/or task performance information to the transmitter such that the transmitter may select an appropriate model to use in inference. In some aspects, the receiver selects the model based on the distortion and/or task performance and indicates the model to the transmitter. The receiver may also indicate the split point or split points of the task network (i.e., the layers of the task network to be performed by each of the devices) to the transmitter.

In some aspects, the transmitter and/or receiver may determine which model to use for their respective parts of the task network based on the encoder configuration and/or decoder configuration. The transmitter may indicate encoder configuration information to the receiver. The receiver may indicate decoder configuration information to the transmitter. The encoder and/or decoder configuration may be based on information about the distortions, a change in task performance, a complexity for the encoder/decoder configuration, network conditions, performance requirements, etc.

FIG. 1 illustrates a wireless communication network 100 according to one or more aspects of the present disclosure. The network 100 may be a 5G network. The network 100 includes a number of BSs 105 (individually labeled as 105a, 105b, 105c, 105d, 105e, and 105f) and other network entities. A BS 105 may be a station that communicates with UEs 115 (individually labeled as 115a, 115b, 115c, 115d, 115e, 115f, 115g, 115h, and 115k) and may also be referred to as an evolved node B (eNB), a 300next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In FIG. 1, the BSs 105*d* and 105*c* may be regular macro BSs, while the BSs 105*a*-105*c* may be macro BSs enabled with one of three dimension (3D), full dimension (FD), or massive MIMO. The BSs 105*a*-105*c* may take advantage of their higher dimension MIMO capabilities to exploit 3D beamforming in both elevation and azimuth beamforming to increase coverage and capacity. The BS 105*f* may be a small cell BS which may be a home node or portable access point. A BS 105 may support one or multiple (e.g., two, three, four, and the like) cells.

In some aspects, the term "base station" (e.g., the base station 105) or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station" or "network entity" may refer to one device configured to perform one or more functions, such as those described herein in connection with the base stations 105. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations and/or one or more virtual base station functions. For example, in some aspects, two or more base station functions may be instantiated on a single device. In some aspects, the term "base station" or "network entity" may refer to one of the base station functions and not another. In this way, a single device may include more than one base station.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115*a*-115*d* are instances of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115*c*-115*h* are instances of various machines configured for communication that access the network 100. The UEs 115*i*-115*k* are instances of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the DL and/or UL, desired transmission between BSs 105, backhaul transmissions between BSs, or sidelink transmissions between UEs 115.

In operation, the BSs 105*a*-105*c* may serve the UEs 115*a* and 115*b* using 3D beamforming and coordinated spatial techniques, such as coordinated multipoint (CoMP) or multi-connectivity. The macro BS 105*d* may perform backhaul communications with the BSs 105*a*-105*c*, as well as small cell, the BS 105*f*. The macro BS 105*d* may also transmits multicast services which are subscribed to and received by the UEs 115*c* and 115*d*. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an instance of a gNB or an access node controller (ANC)) may interface with the core network through backhaul links (e.g., NG-C, NG-U, etc.) and may perform radio configuration and scheduling for communication with the UEs 115. In various cases, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115*c*, which may be a drone. Redundant communication links with the UE 115*e* may include links from the macro BSs 105*d* and 105*e*, as well as links from the small cell BS 105*f*. Other machine type devices, such as the UE 115*f* (e.g., a thermometer), the UE 115*g* (e.g., smart meter), and UE 115*h* (e.g., wearable device) may communicate through the network 100 either directly with BSs, such as the small cell BS 105*f*, and the macro BS 105*c*, or in multi-action-size configurations by communicating with another user device which relays its information to the network, such as the UE 115*f* communicating temperature measurement information to the smart meter, the UE 115g, which is then reported to the network through the small cell BS 105f. The network 100 may also provide additional network efficiency through dynamic, low-latency TDD/FDD communications, such as V2V, V2X, C-V2X communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some aspects, the subcarrier spacing between adjacent subcarriers may be fixed, and the total number of subcarriers (K) may be dependent on the system BW. The system BW may also be partitioned into subbands. In other aspects, the subcarrier spacing and/or the duration of TTIs may be scalable.

In some aspects, the BSs 105 can assign or schedule transmission resources (e.g., in the form of time-frequency resource blocks (RB)) for DL and UL transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for instance, about 10. Each slot may be further divided into mini-slots. In a FDD mode, simultaneous UL and DL transmissions may occur in different frequency bands. For instance, each subframe includes a UL subframe in a UL frequency band and a DL subframe in a DL frequency band. In a TDD mode, UL and DL transmissions occur at different time periods using the same frequency band. For instance, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For instance, each DL or UL subframe may have pre-defined regions for transmissions of reference signals, control information, and data. Reference signals are predetermined signals that facilitate the communications between the BSs 105 and the UEs 115. For instance, a reference signal can have a particular pilot pattern or structure, where pilot tones may span across an operational BW or frequency band, each positioned at a pre-defined time and a pre-defined frequency. For instance, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for DL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some aspects, the BSs 105 may broadcast the PSS, the SSS, and/or the MIB in the form of synchronization signal block (SSBs) and may broadcast the RMSI and/or the OSI over a physical downlink shared channel (PDSCH). The MIB may be transmitted over a physical broadcast channel (PBCH).

In some aspects, a UE 115 attempting to access the network 100 may perform an initial cell search by detecting a PSS from a BS 105. The PSS may enable synchronization of period timing and may indicate a physical layer identity value. The UE 115 may then receive an SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some instances, the random access procedure may be a four-step random access procedure. For instance, the UE 115 may transmit a random access preamble and the BS 105 may respond with a random access response. The random access response (RAR) may include a detected random access preamble identifier (ID) corresponding to the random access preamble, timing advance (TA) information, an UL grant, a temporary cell-radio network temporary identifier (C-RNTI), and/or a backoff indicator. Upon receiving the random access response, the UE 115 may transmit a connection request to the BS 105 and the BS 105 may respond with a connection response. The connection response may indicate a contention resolution. In some instances, the random access preamble, the RAR, the connection request, and the connection response can be referred to as message 1 (MSG1), message 2 (MSG2), message 3 (MSG3), and message 4 (MSG4), respectively. In some instances, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For instance, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant. The connection may be referred to as an RRC connection. When the UE 115 is actively exchanging data with the BS 105, the UE 115 is in an RRC connected state.

In some aspects, after establishing a connection with the BS 105, the UE 115 may initiate an initial network attachment procedure with the network 100. The BS 105 may coordinate with various network entities or fifth generation core (5GC) entities, such as an access and mobility function (AMF), a serving gateway (SGW), and/or a packet data network gateway (PGW), to complete the network attachment procedure. For instance, the BS 105 may coordinate with the network entities in the 5GC to identify the UE, authenticate the UE, and/or authorize the UE for sending and/or receiving data in the network 100. In addition, the AMF may assign the UE with a group of tracking areas (TAs). Once the network attach procedure succeeds, a context is established for the UE 115 in the AMF. After a successful attach to the network, the UE 115 can move around the current TA. For tracking area update (TAU), the BS 105 may request the UE 115 to update the network 100 with the UE 115's location periodically. Alternatively, the UE 115 may only report the UE 115's location to the network 100 when entering a new TA. The TAU allows the network 100 to quickly locate the UE 115 and page the UE 115 upon receiving an incoming data packet or call for the UE 115.

In some aspects, the BS 105 may communicate with a UE 115 using HARQ techniques to improve communication reliability, for instance, to provide a URLLC service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). After receiving the DL data packet, the UE 115 may transmit a feedback message for the DL data packet to the BS 105. In some instances, the UE 115 may transmit the feedback on an acknowledgment resource. The feedback may be an acknowledgement (ACK) indicating that reception of the DL data packet by the UE 115 is successful (e.g., received the DL data without error) or may be a negative-acknowledgement (NACK) indicating that reception of the DL data packet by the UE 115 is unsuccessful (e.g., including an error or failing an error correction). In some aspects, if the UE 115 receives the DL data packet successfully, the UE 115 may transmit a HARQ ACK to the BS 105. Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For instance, the BWP pair may include one BWP for UL communications and one BWP for DL communications.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 2:
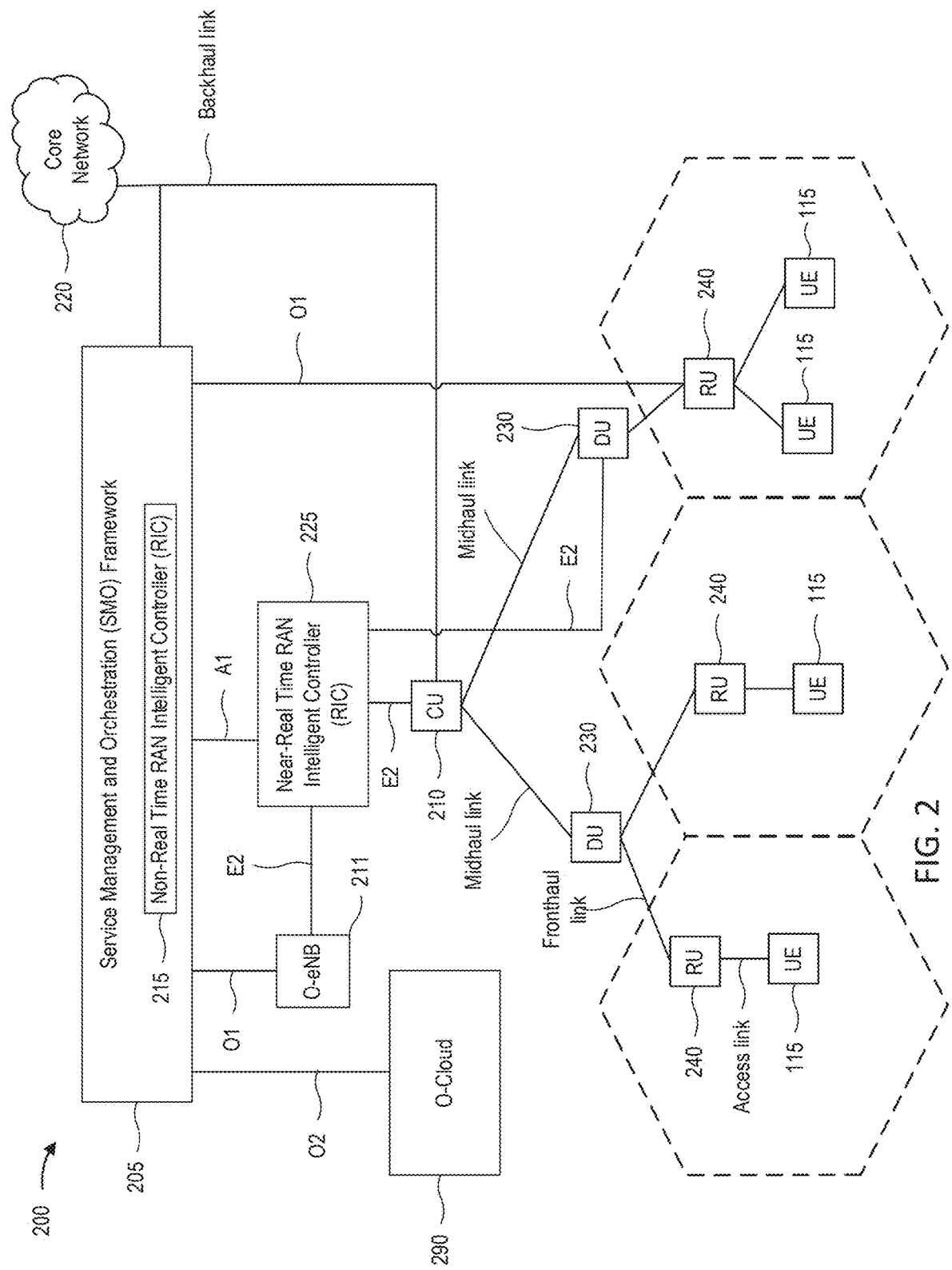
FIG. 2 illustrates a diagram of an example disaggregated base station architecture according to one or more aspects of the present disclosure.

FIG. 2 illustrates a diagram of an example disaggregated base station 200 architecture according to one or more aspects of the present disclosure. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 115 via one or more radio frequency (RF) access links. In some implementations, the UE 115 may be simultaneously served by multiple RUs 240.

Each of the units, i.e., the CUs 210, the DUs 230, the RUs 240, as well as the Near-RT RICs 225, the Non-RT RICs 215, and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (i.e., Central Unit-User Plane (CU-UP)), control plane functionality (i.e., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communication with one or more UEs 115. In some implementations, real-time and non-real-time aspects of control and user plane communication with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-CNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-cNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
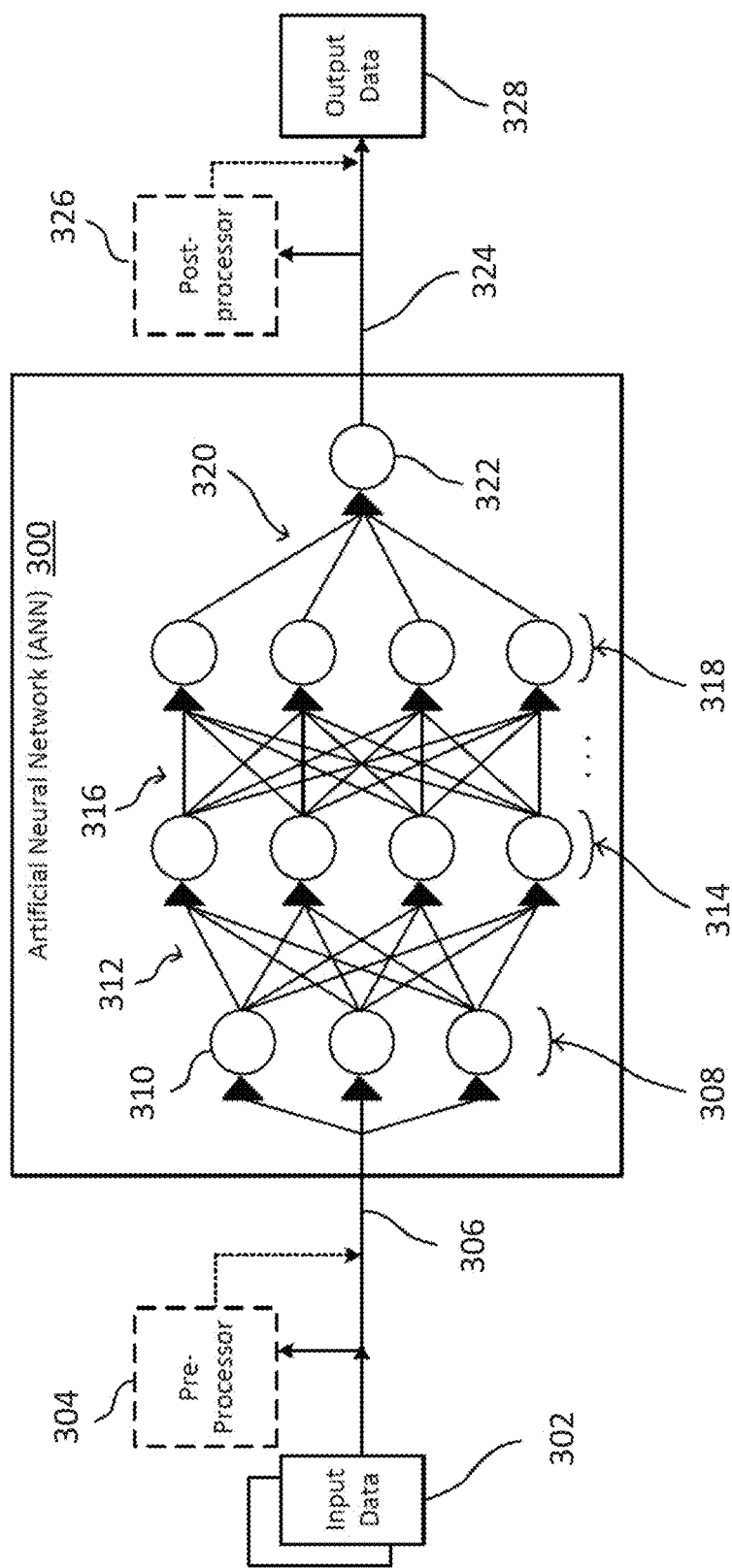
FIG. 3 is an illustrative block diagram of an example machine learning (ML) model represented by an artificial neural network (ANN).

FIG. 3 is an illustrative block diagram of an example machine learning (ML) model represented by an artificial neural network (ANN) 300. ANN 300 may receive input data 306 which may include one or more bits of data 302, pre-processed data output from pre-processor 304 (optional), or some combination thereof. Here, data 302 may include training data, verification data, application-related data, or the like, based, for example, on the stage of deployment of ANN 300. Pre-processor 304 may be included within ANN 300 in some other implementations.

Pre-processor 304 may, for example, process all or a portion of data 302 which may result in some of data 302 being changed, replaced, deleted, etc. In some implementations, pre-processor 304 may add additional data to data 302. In some implementations, the pre-processor 304 may be a ML model, such as an ANN. For example, training data may include audio or video data and ground-truth modified data. Different models may be trained under different simulated conditions by including an encoder/decoder pair in-between layers of the ML model.

ANN 300 includes at least one first layer 308 of artificial neurons 310 to process input data 306 and provide resulting first layer data via connections or "edges" such as edges 312 to at least a portion of at least one second layer 314. Second layer 314 processes data received via edges 312 and provides second layer output data via edges 316 to at least a portion of at least one third layer 318. Third layer 318 processes data received via edges 316 and provides third layer output data via edges 320 to at least a portion of a final layer 322 including one or more neurons to provide output data 324. All or part of output data 324 may be further processed in some manner by (optional) post-processor 326. Thus, in certain examples, ANN 300 may provide output data 328 that is based on output data 324, post-processed data output from post-processor 326, or some combination thereof.

Post-processor 326 may be included within ANN 300 in some other implementations. Post-processor 326 may, for example, process all or a portion of output data 324 which may result in output data 328 being different, at least in part, to output data 324, as result of data being changed, replaced, deleted, etc. In some implementations, post-processor 326 may be configured to add additional data to output data 324. In this example, second layer 314 and third layer 318 represent intermediate or hidden layers that may be arranged in a hierarchical or other like structure. Although not explicitly shown, there may be one or more further intermediate layers between the second layer 314 and the third layer 318. In some implementations, the post-processor 326 may be a ML model, such as an ANN.

The structure and training of artificial neurons 310 in the various layers may be tailored to specific requirements of an application. Within a given layer such as first layer 308, second layer 314, or third layer 318 of ANN 300, some or all of the neurons may be configured to process information provided to the layer and output corresponding transformed information from the layer. For example, transformed information from a layer may represent a weighted sum of the input information associated with or otherwise based on a non-linear activation function or other activation function used to "activate" artificial neurons of a next layer. Artificial neurons in such a layer may be activated by or be responsive to parameters such as the previously described weights and biases of ANN 300. The weights and biases of ANN 300 may be adjusted during a training process or during operation of ANN 300. The weights of the various artificial neurons may control a strength of connections between layers or artificial neurons, while the biases may control a direction of connections between the layers or artificial neurons. An activation function may select or determine whether an artificial neuron transmits its output to the next layer or not in response to its received data.

Different activation functions may be used to model different types of non-linear relationships. By introducing non-linearity into an ML model, an activation function allows the configuration for the ML model to change in response to identifying or detecting complex patterns and relationships in the input data 306. Some non-exhaustive example activation functions include a sigmoid based activation function, a hyperbolic tangent (tanh) based activation function, a convolutional activation function, up-sampling, pooling, and a rectified linear unit (RcLU) based activation function.

Training of an ML model, such as ANN 300, may be conducted using training data. Training data may include one or more datasets which ANN 300 may use to identify patterns or relationships. Training data may represent various types of information, including written, visual, audio, environmental context, operational properties, etc. During training, the parameters (such as the weights and biases) of artificial neurons 310 may be changed, such as to minimize or otherwise reduce a loss function or a cost function. A training process may be repeated multiple times to fine-tune ANN 300 with each iteration.

Various ANN model structures are available for consideration. For example, in a feedforward ANN structure, each artificial neuron 310 in layer 314 receives information from the previous layer (such as, one or more artificial neurons 310 in layer 308) and produces information for the next layer (such as, one or more artificial neurons 310 in layer 318). In a convolutional ANN structure, some layers may be organized into filters that extract features from data, such as the training data or the input data. In a recurrent ANN structure, some layers may have connections that allow for processing of data across time, such as for processing information having a temporal structure, such as time series data forecasting.

In an autoencoder ANN structure, compact representations of data may be processed and the model trained to predict or potentially reconstruct original data from a reduced set of features. An autoencoder ANN structure may be useful for tasks related to dimensionality reduction and data compression.

A generative adversarial ANN structure may include a generator ANN and a discriminator ANN that are trained to compete with each other. Generative-adversarial networks (GANs) are ANN structures that may be useful for tasks relating to generating synthetic data or improving the performance of other models.

A transformer ANN structure makes use of attention mechanisms that may enable the model to process input sequences in a parallel and efficient manner. An attention mechanism allows the model to focus on different parts of the input sequence at different times. Attention mechanisms may be implemented using a series of layers known as attention layers to compute weighted sums of input features based on a similarity between different elements of the input sequence. A transformer ANN structure may include a series of feedforward ANN layers whose configurations may change in response to identifying non-linear relationships between the input and output sequences, which may also be referred to as a process of "learning" by the ANN layers. The output of a transformer ANN structure may be obtained by applying a linear transformation to the output of a final attention layer. A transformer ANN structure may be of particular use for tasks that involve sequence modeling, or other like processing.

Another example type of ANN structure is a model with one or more invertible layers. Models of this type may be inverted or "unwrapped" to reveal the input data that was used to generate the output of a layer. Other example types of ANN model structures include fully connected neural networks (FCNNs) and long short-term memory (LSTM) networks.

ANN 300 or other ML models may be implemented in various types of processing circuits along with memory and applicable instructions therein. For example, general-purpose hardware circuits, such as, such as one or more central processing units (CPUs), one or more graphics processing units (GPUs), or suitable combinations thereof, may be employed to implement a model. In some implementations, one or more tensor processing units (TPUs), neural processing units (NPUs), or other special-purpose processors, field-programmable gate arrays (FPGAs), application-specific integrated circuits (ASICs), or the like may also be employed. In some implementations, the ML model may be implemented by a NPU or a TPU embedded in a system on chip (SoC) along with other components, such as one or more CPUs, GPUs, etc. A SoC includes several components manufactured on a shared semiconductor substrate. The NPU or TPU may be controlled by the one or more CPUs by configuring the ML model implemented by the NPU or TPU with weights and biases, providing certain training data to the ML model to configure the ML model, or providing input data to the ML model to obtain related inferences. The one or more CPUs may also receive the inferences and be configured to perform certain actions based on the inferences produced by the ML model. The actions performed by the one or more CPUs may include sending commands to other components of the SoC or components external to the SoC to perform certain actions. For example, the CPU may send commands to a RF transceiver based on the outputs or inferences obtained from an ML model to cause the RF transceiver to operate on a wireless network in accordance with the ML model.

In example aspects, an ML model may be trained prior to, or at some point following, operation of the ML model, such as ANN 300, on input data. When training the ML model, information in the form of applicable training data may be gathered or otherwise created for use in training an ANN accordingly. For example, training data may be gathered or otherwise created regarding information associated with received/transmitted signal strengths, interference, and resource usage data, as well as any other relevant data that might be useful for training a model to address one or more problems or issues in a communication system. In certain instances, all or part of the training data may originate in a user equipment (UE) or other device in a wireless communication system, or one or more network entities, or aggregated from multiple sources (such as a UE and a network entity/entities, one or more other UEs, the Internet, or the like). For example, wireless network architectures, such as self-organizing networks (SON) or mobile drive test (MDT) networks, may be adapted to support collection of data for ML model applications. In another example, training data may be generated or collected online, offline, or both online and offline by a UE, network entity, or other device(s), and all or part of such training data may be transferred or shared (in real or near-real time), such as through store and forward functions or the like. Multiple models may be trained for various conditions. For example, a model (including a first part and second part) may be trained for a high level of compression of the intermediate representation between the first part and the second part. A different model may be trained for a lower level of compression. Additional models may be trained under a number of conditions including different quantization levels, simulated communication network conditions, etc. The different models may have their parameters stored in memory such that the model may be configured with the appropriate model parameters based on a determination and/or indication as described herein. In some aspects, both the first part and the second part of the model may be reconfigurable with different model parameters, and in some aspects only one of the two parts is reconfigurable with different model parameters and the other part is fixed after training.

Offline training may refer to creating and using a static training dataset, such as, in a batched manner, whereas online training may refer to a real-time collection and use of training data. For example, an ML model at a network device (such as, a UE) may be trained or fine-tuned using online or offline training. For offline training, data collection and training can occur in an offline manner at the network side (such as, at a base station or other network entity) or at the UE side. For online training, the training of a UE-side ML model may be performed locally at the UE or by a server device (such as, a server hosted by a UE vendor) in a real-time or near-real-time manner based on data provided to the server device from the UE. In certain instances, all or part of the training data may be shared within a wireless communication system, or even shared (or obtained from) outside of the wireless communication system.

Once an ANN has been configured by setting parameters, including weights and biases, from training data, the ANN's performance may be evaluated. In some scenarios, evaluation/verification tests may use a validation dataset, which may include data not in the training data, to compare the model's performance to baseline or other benchmark information. The ANN configuration may be further refined, for example, by changing its architecture, re-training it on the data, or using different optimization techniques, etc.

As part of a training process, parameters affecting the functioning of the artificial neurons and layers may be adjusted. For example, backpropagation techniques may be used to train an ANN by iteratively adjusting weights or biases of certain artificial neurons associated with errors between a predicted output of the model and a desired output that may be known or otherwise deemed acceptable. Backpropagation may include a forward pass, a loss function, a backward pass, and a parameter update that may be performed in training iteration. The process may be repeated for a certain number of iterations for each set of training data until the weights of the artificial neurons/layers are adequately tuned.

Distributed, shared, or collaborative learning techniques may be used for the training process. For example, techniques such as federated learning may be used to decentralize the training process and rely on multiple devices, network entities, or organizations for training various versions or copies of a ML model, without relying on a centralized training mechanism. Federated learning may be particularly useful in scenarios where data is sensitive or subject to privacy constraints, or where it is impractical, inefficient, or expensive to centralize data. In the context of wireless communication, for example, federated learning may be used to improve performance by allowing an ANN to be trained on data collected from a wide range of devices and environments. For example, an ANN may be trained on data collected from a large number of wireless devices in a network, such as distributed wireless communication nodes, smartphones, or internet-of-things (IoT) devices, to improve the network's performance and efficiency. With federated learning, a user equipment (UE) or other device may receive a copy of all or part of a global or shared model and perform local training on the local model using locally available training data. The UE may provide update information regarding the locally trained model to one or more other devices (such as a network entity or a server) where the updates from other-like devices (such as other UEs) may be aggregated and used to provide an update to global or shared model. A federated learning process may be repeated iteratively until all or part of a model obtains a satisfactory level of performance. Federated learning may enable devices to protect the privacy and security of local data, while supporting collaboration regarding training and updating of all or part of a shared model. In some aspects, a local model may be a second part of a larger model where the first part is on another network device (e.g., a BS 105). Methods described herein may be utilized to update the parameters of the local model based on the circumstances as described herein.

In some implementations, one or more devices or services may support processes relating to a ML model's usage, maintenance, activation, reporting, or the like. In certain instances, all or part of a dataset or model may be shared across multiple devices, to provide or otherwise augment or improve processing. In some examples, signaling mechanisms may be utilized at various nodes of wireless network to signal the capabilities for performing specific functions related to ML model, support for specific ML models, capabilities for gathering, creating, transmitting training data, or other ML related capabilities. ML models in wireless communication systems may, for example, be employed to support decisions or improve performance relating to wireless resource allocation or selection, wireless channel condition estimation, interference mitigation, beam management, positioning accuracy, energy savings, or modulation or coding schemes, etc. In some implementations, model deployment may occur jointly or separately at various network levels, such as, a UE, a network entity such as a base station, or a disaggregated network entity such as a central unit (CU), a distributed unit (DU), a radio unit (RU), or the like.

Figure 4:
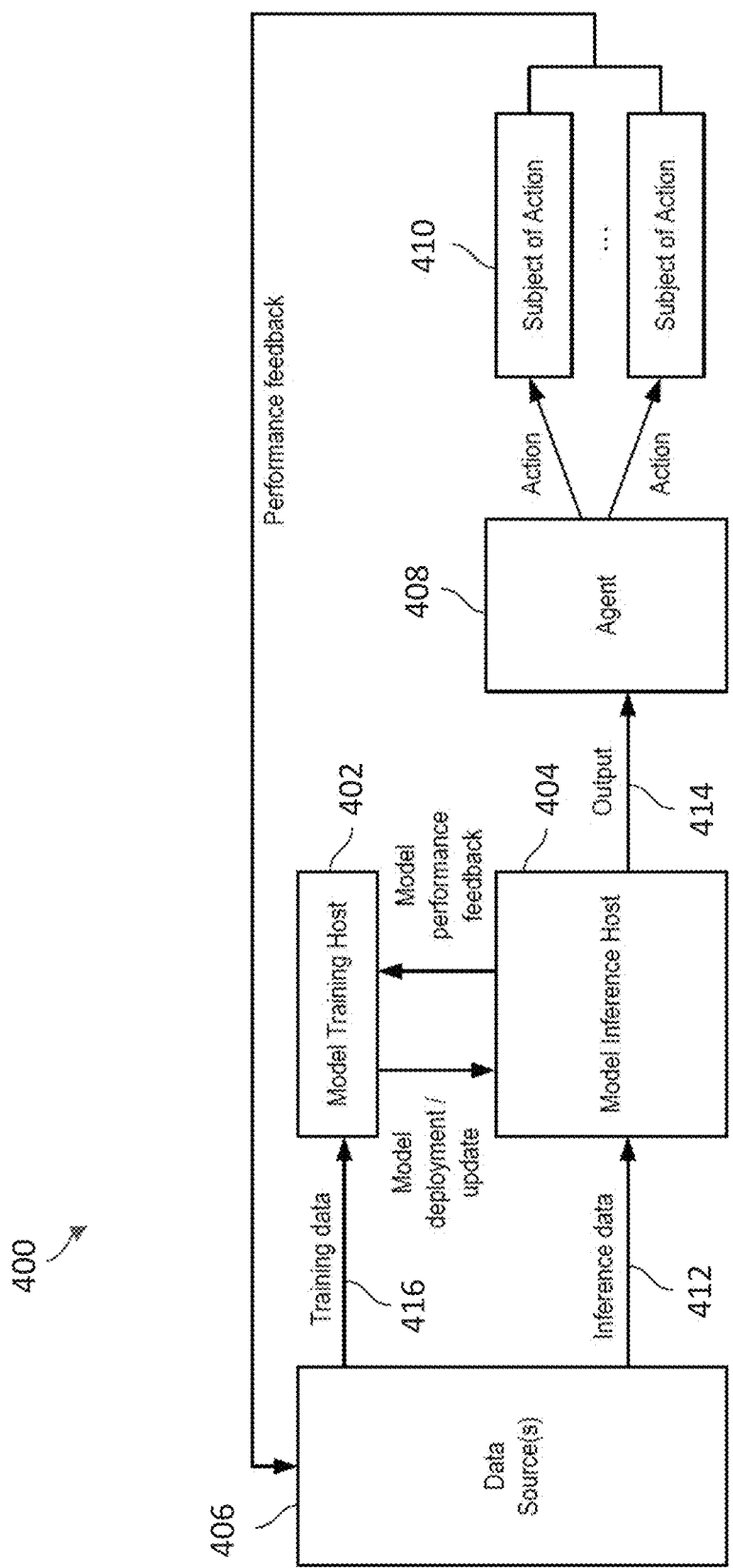
FIG. 4 is an illustrative block diagram of an example machine learning (ML) architecture according to one or more aspects of the present disclosure.

FIG. 4 is an illustrative block diagram of an example machine learning (ML) architecture 400 that may be used for wireless communications in any of the various implementations, processes, environments, networks, or use cases listed above. As illustrated, architecture 400 includes multiple logical entities, such as model training host 402, model inference host 404, data source(s) 406, and agent 408. Model inference host 404 is configured to run an ML model based on inference data 412 provided by data source(s) 406. Model inference host 404 may produce output 414, which may include a prediction or inference, such as a discrete or continuous value based on inference data 412, which may then be provided as input to the agent 408. Model inference host 404 may be a user equipment (e.g., a UE 115), a base station (e.g. BS 105), or a disaggregated network entity (such as a centralized unit (CU) 210, a distributed unit (DU) 230, or a radio unit (RU) 240, an access point, a wireless station, a RAN intelligent controller (RIC) 225 in a cloud-based RAN, among some examples. As described herein, multiple devices may host models for inference that may be used together by communicating intermediate representations via a network. For example, a first model inference host 404 may host a first model including a first number of layers, may encode the generated intermediate representation, and communicate that intermediate representation to a second model inference host 404. The second model inference host 404 may receive the intermediate representation and complete the inference via a second model with a second number of layers. In some aspects, the communication of the intermediate representation may be encoded/compressed and decoded/decompressed to facilitate communication over the communication network. Model parameters for each of the two models may be reconfigured based on one or more conditions/indications as described herein.

Agent 408 may represent an element or an entity of a wireless communication system including, for example, a radio access network (RAN), a wireless local area network, a device-to-device (D2D) communications system, etc. As an example, agent 408 may be a user equipment (e.g., a UE 115), a base station (e.g. BS 105), or a disaggregated network entity (such as a centralized unit (CU) 210, a distributed unit (DU) 230, or a radio unit (RU) 240, an access point, a wireless station, a RAN intelligent controller (RIC) 225 in a cloud-based RAN, among some examples. Additionally, agent 408 also may be a type of agent that depends on the type of tasks performed by model inference host 404, the type of inference data 412 provided to model inference host 404, or the type of output 414 produced by model inference host 404.

For example, if output 414 from model inference host 404 is associated with beam management, agent 408 may be or include a UE, a DU, or an RU. As another example, if output 414 from model inference host 404 is associated with transmission or reception scheduling, agent 408 may be a CU or a DU Agent 408 may perform one or more actions associated with receiving output 414 from model inference host 404. For example, if agent 408 is a DU or an RU and the output from model inference host 404 is associated with beam management, agent 408 may determine whether to change or modify a transmit or receive beam based on output 414. Agent 408 may indicate the one or more actions performed to at least one subject of action 410. For example, if the agent 408 determines to change or modify a transmit or receive beam for a communication between agent 408 and the subject of action 410 (such as, a UE), agent 408 may send a beam switching indication to the subject of action 410 (such as, the UE). As another example, agent 408 may be a UE and output 414 from model inference host 404 may one or more predicted channel characteristics for one or more beams. For example, model inference host 404 may predict channel characteristics for a set of beam based on the measurements of another set of beams. Based on the predicted channel characteristics, agent 408, the UE, may send, to the BS, a request to switch to a different beam for communications. In some cases, agent 408 and the subject of action 410 are the same entity.

Data can be collected from data sources 406, and may be used as training data 416 for training an ML model, or as inference data 412 for feeding an ML model inference operation. Data sources 406 may collect data from various subject of action 410 entities (such as, the UE or the network entity), and provide the collected data to a model training host 402 for ML model training. For example, after a subject of action 410 (such as, a UE) receives a beam configuration from agent 408, the subject of action 410 may provide performance feedback associated with the beam configuration to the data sources 406. The performance feedback may be used by the model training host 402 for monitoring or evaluating the ML model performance. In some examples, if output 414 provided to agent 408 is inaccurate (or the accuracy is below an accuracy threshold), model training host 402 may provide feedback to model inference host 404 to modify or retrain the ML model used by model inference host 404, such as via an ML model deployment update.

Model training host 402 may be deployed at the same or a different entity than that in which model inference host 4104 is deployed. For example, in order to offload model training processing, which can impact the performance of model inference host 404, model training host 402 may be deployed at a model server.

In some aspects, an ML model is deployed at or on multiple communication devices such as a network entity (such as BS 105) and a UE 115. The model may perform a function such as audio/video/image processing.

In some aspects, the ML model may be collaboratively deployed across multiple entities such as one or more UEs and a BS, or across multiple network entities. The split point or split points of the model across devices and/or the specific set of parameters deployed at any time may be selected and configured as described herein, for example at least in reference to FIGS. 6-13.

Figure 5:
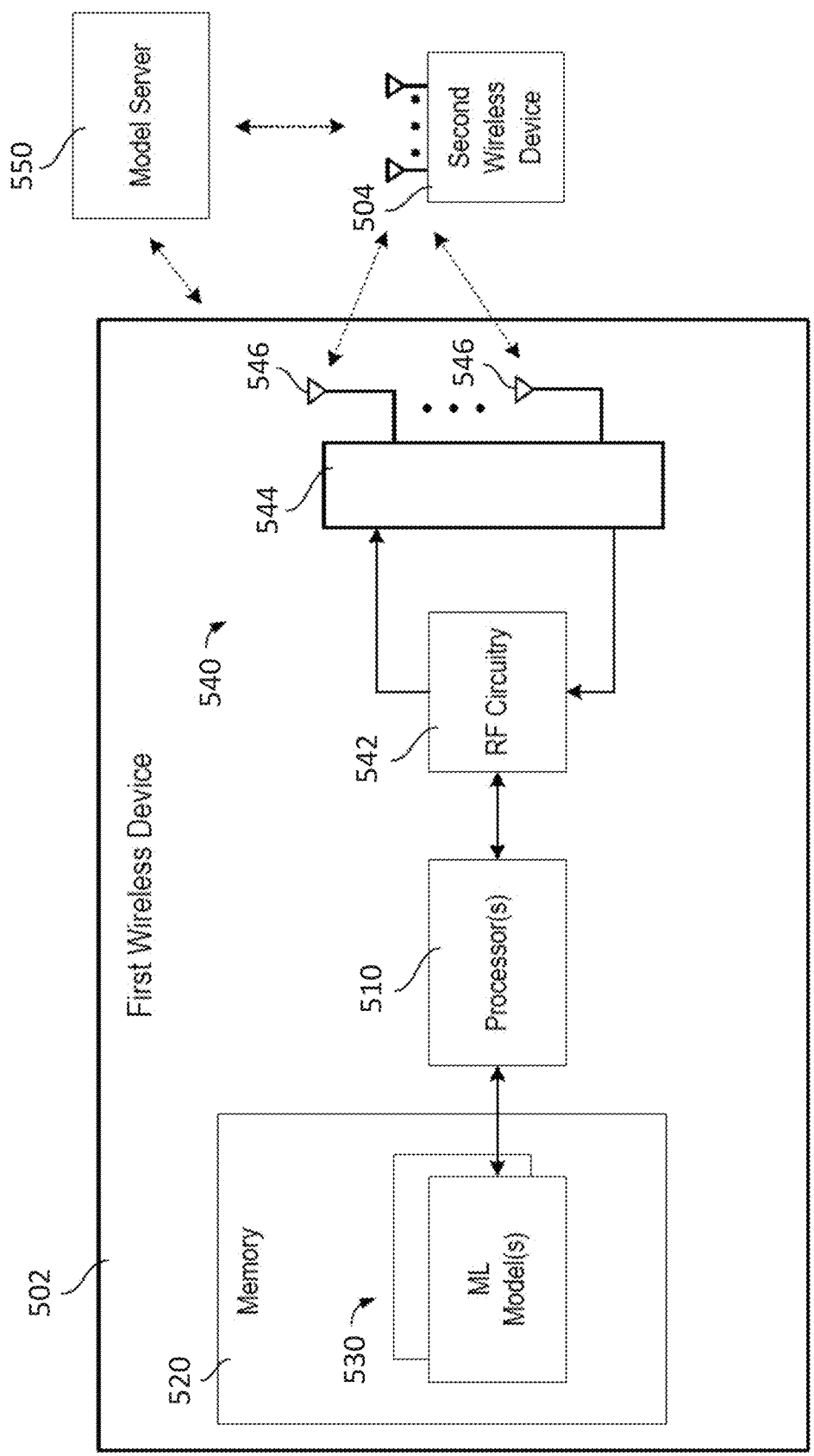
FIG. 5 illustrates an illustrative block diagram of an example ML architecture of first wireless device in communication with second wireless device according to one or more aspects of the present disclosure.

FIG. 5 illustrates an illustrative block diagram of an example ML architecture of first wireless device 502 in communication with second wireless device 504. First wireless device 502 may be configured for audio processing, image processing, video processing, etc. Similarly, the second wireless device may be configured for audio processing, image processing, video processing, etc. Note that the example ML architecture of first wireless device 502 may be applied to second wireless device 504, and vice versa. As described herein models on each of the first wireless device 502 and the second wireless device 504 may be two parts of the same model, where each part may be jointly or independently reconfigured depending on current conditions.

First wireless device 502 may be, or may include, a chip, system on chip (SoC), chipset, package or device that includes one or more processors, processing blocks or processing elements (collectively "processor 510") and one or more memory blocks or elements (collectively "memory 520"). Processor 510 may be coupled to transceiver 540, which includes radio frequency (RF) circuitry 542 coupled to antennas 546 via interface 544, for transmitting or receiving signals.

One or more ML models 530 (collectively "ML model 530") may be stored in memory 520 and accessible to processor(s) 510. Individual or groups of ML models 530 may be associated with respective model identifiers. In some aspects, different ML models 530, which may optionally be associated with different model identifiers, may have different characteristics. One or more ML models 530 may be selected based on respective features, characteristics, or applications, as well as characteristics or conditions of first wireless device 502 (such as, a power state, a mobility state, a battery reserve, a temperature, etc.). For example, ML models 530 may have different inference data and output pairings (such as, different types of inference data produce different types of output), different levels of accuracies associated with the predictions, different latencies associated with producing the predictions, different ML model sizes, different coefficients, different parameters, etc.

Processor 510 may deploy ML models 530 to produce respective output data based on input data. For example, ML model 530 may produce an image segmentation based on an input image (or based on an intermediate representation of the input image provided by second wireless device 504) may produce an output image segmentation, or a classification associated with the image.

In some aspects, model server 550 may perform various ML management tasks for first wireless device 502 and/or second wireless device 504. For example, model server 550 may host various types and/or versions of ML models 530 for first wireless device 502 and/or second wireless device 504 to download. Model server 550 may monitor and evaluate the performance of ML model 530. Model server 550 may transmit signals or provide indications/instructions to activate or deactivate the use of a particular ML model at first wireless device 502 or second wireless device 504. Model server 550 may switch to a different ML model 550 being used at first wireless device 502 or second wireless device 504, and model server 550 may provide such an instruction to the respective first wireless device 502 or second wireless device 504. Model server 550 may operate as a model training host (such as model training host 402) and update ML model 530 using training data. In some cases, the model server 550 may operate as a data source (such as data source 406) to collect and host training data, inference data, performance feedback, etc., associated with ML model 530.

Figure 6:
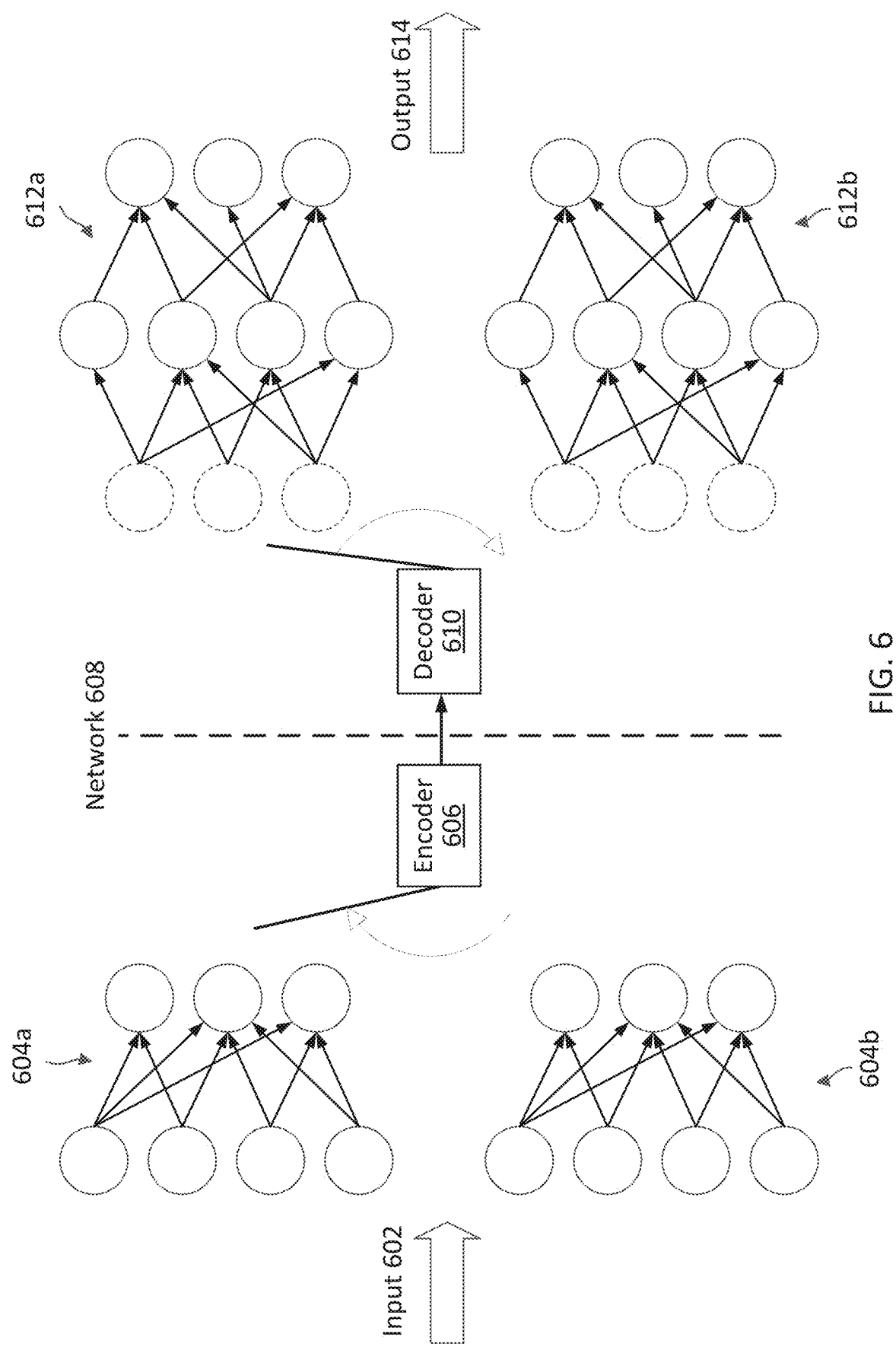
FIG. 6 illustrates a simplified diagram of a split inference architecture according to one or more aspects of the present disclosure.

FIG. 6 illustrates a simplified diagram of a split inference architecture according to one or more aspects of the present disclosure. A task network (e.g., an ANN) may be split across multiple devices, such that each stores a component task network. In the illustrated example, a first device includes task network 604, and the second device includes task network 612. Each task network may have multiple sets of parameters associated with the task network, resulting in different models when the different parameters are implemented. For example, in the illustrated example, task network 604 may switch between model 604a and 604b, which may have the same network structure, but with different parameters (e.g., weights and biases, etc.). Likewise, the second device may switch between models 612a and 612b which may have the same network structure, but with different parameters (e.g., weights and biases, etc.). The different model parameters may be trained in a way to optimize different conditions. The first and second devices may be connected via a wired connection, or a wireless connection (i.e., network 608 may be wired or wireless). The first and second devices may be network devices on a network such as the one described in FIGS. 1-2, for example they may be a UE 115 and a BS 105, may both be UEs 115, etc. In some aspect, task network 604 and task network 612 together perform a single task, for example, object tracking.

The two task network parts together may work to generate an output 614 based on an input 602. For example, the first device may receive or generate input 602 (e.g., an image) and process it using model 604a or 604b to provide an intermediate representation. In some aspects, input 602 is received from the second device (e.g., the second device may be a UE 115 that sends an input image to be processed by the first device, and the final layers of inference are performed by the UE 115 for user-specific capability). In some aspects, the intermediate representation may be a vector representation, feature map, activation, etc. The intermediate representation may be encoded by encoder 606 and transmitted by the first device over communication network 608. The second device may receive the encoded intermediate representation and decode it via decoder 610. Additional details of an exemplary encoder 606 and decoder 610 are described in FIGS. 7A-7B. The decoded intermediate representation my complete processing by one of models 612a or 612b to produce output 614 (e.g., an image segmentation). The encoding/decoding of the intermediate representation may be performed to account for limitations of communication network 608 and/or the two devices. For example, if communication network 608 only supports a limited bandwidth, then encoder 606 may compress the intermediate representation in one or more ways (e.g., feature reduction, quantization, and/or other compression methods). This compression may be a lossy compression such that decoder 610 may not perfectly reproduce the intermediate representation.

Different model parameters may be better optimized for performance under different network conditions and/or encoder/decoder configurations, and therefore it may be beneficial to change between models (e.g., from model 604*a* to 604*b* and/or from model 612*a* to 612*b*) based on those conditions.

In some aspects, the first device may determine a distortion level of the intermediate representation and/or a change in task performance. The first device may indicate the distortion and/or task performance information to the second device such that the second device may select an appropriate model to use in inference. For example, the second device may be preconfigured to use model 612*a* when the distortion and/or task performance are above a threshold, and use model 612*b* when the distortion and/or task performance are below the threshold. Multiple thresholds may be utilized to switch between a greater number of models. In some aspects, the first device directly selects the model based on the distortion and/or task performance and indicates the selected model to the second device which implements the model as indicated. The first device may also indicate the split point or split points of the task network (i.e., the layers of the task network to be performed by each of the devices) to the second device. For example, the first device may determine to perform the first 15 layers of a task network, and have the second device perform only the last 3 layers of the task network. This may be communicated by indicating the number of layers, indicating an index to a table that identifies the desired network depth, etc. Based on changing conditions, the first device may change the split point or split points and indicate the change in the same manner.

The distortion measured and indicated by the first device may be a distortion associated with encoding and decoding the intermediate representation. In order to determine the distortion, the first device may include a copy of the decoder 610 so that it may perform both the encoding and decoding, and compare the intermediate representation before and after. The distortion may be measured, for example, as the mean square error (MSE) comparing the intermediate representation without encoding/decoding to the intermediate representation after encoding and decoding. As described above, the distortion level may be communicated to the second device so that the second device may select the appropriate model based on the distortion, or the first device may select the appropriate model based on the distortion and indicate the selection to the second device. The distortion may depend on the specific configurations of the encoder and/or decoder such as quantization level, feature reduction configuration, compression configuration, etc. As such, the first device may redetermine the distortion and/or the selected model parameters each time the encoder 606 and/or decoder 610 are reconfigured. To facilitate the measurement, the second device may indicate decoder 610 configuration to the first device.

Similar to the measurement of distortion, the first device may measure overall task performance change with and without the encoder 606 decoder 610 bottleneck. First device may include a copy of task network 612 in addition to a copy of decoder 610 so that it may perform the full task inference to perform a task performance measurement. The copy of task network 612 may be communicated from the second device to the first device as necessary, or in an initial configuration step. The copy of task network 612 may be initialized with a default set of parameters, or the task performance may be measured over multiple sets of parameters for task network 612. The task performance difference may be determined by a comparison of an output generated using task networks 604 and 612 without any intermediate encoding/decoding to an output generated with the intermediate encoding/decoding. As with distortion, the task performance measurement may be communicated to the second device so that the second device may select the appropriate model based on the task performance (or difference in task performance), or the first device may select the appropriate model based on the task performance and indicate the selection to the second device. Distortion, task performance, and other metrics may be used in combination to determine model parameters.

Additional or alternative metrics may be used by the first and/or second device in selecting a model for inference. For example, the cost of swapping models (e.g., the energy cost, time cost, memory cost, communication network bandwidth cost, etc.), the channel capacity, or the delay (e.g., the communication delay of communicating the encoded representations over communication network 608). The first device may indicate these metrics to the second device for the second device to determine parameters, or the first device may determine the parameters for the second device based on one or more of the metrics and indicate the selected parameters to the second device.

In an example, the task completed by task networks 604 and 612 may be generating bounding boxes around dogs found in an input image. The task performance change may be measured by comparing the change in bounding box locations with and without the intermediate encoding/decoding. Other metrics for task performance may include multiple object tracking accuracy (MoTA) or mean average precision (mAP).

In some aspects, the second device may also consider any cost associated with model switching when determining to switch between models as indicated by the first device. For example, the second device may wait until it received a preconfigured number of indications of a set of model parameters before changing to those model parameters as a form of hysteresis to avoid undue model switching.

Indications of distortion, model performance, or indications of specific model parameters may be communicated by the first device in-band within the bitstream generated by encoder 606 such as in a supplemental enhancement information (SEI) message. In some aspects, indications may be communicated by the first device out-of-band with the bitstream such as in a session description protocol (SDP) message.

In some aspects, the second device may determine a predicted distortion level and/or a predicted task performance based on test data. The second device may indicate the distortion and/or task performance information to the first device such that the first device may select an appropriate model to use in inference. In some aspects, the second device selects the model based on the distortion and/or task performance and indicates the model to the first device. The second device may also indicate the split point or split points of the task network (i.e., the layers of the task network to be performed by each of the devices) to the first device.

For example, a preconfigured test intermediate representation may be encoded via a copy of encoder 606 and decoded via decoder 610. The test intermediate representation may be compared to the encoded/decoded representation to determine a change in distortion. In some aspects, the test data is pre-encoded so that the second device does not need to utilize a copy of encoder 606. This change in distortion may be used to select the model parameters for task network 612. The change in distortion may be indicated to the first device so that the first device may select model parameters for task network 604. In some aspects, the first device may reconfigure the encoder 606 and/or decoder 610 and may indicate the configuration(s) to the second device). The second device may use these indicate configurations in measuring distortion of the test data. The distortion measurement may be, for example, a mean square error (MSE).

Similar to the measurement of distortion, the second device may measure overall task performance change with and without the encoder 606 decoder 610 bottleneck. The second device may include a copy of task network 604 in addition to a copy of encoder 606 so that it may perform the full task inference to perform a task performance measurement. The copy of task network 604 and/or encoder 606 configurations may be communicated from the first device to the second device as necessary, or in an initial configuration step. The copy of task network 604 may be initialized with a default set of parameters, or the task performance may be measured over multiple sets of parameters for task network 604. The task performance difference may be determined by a comparison of an output generated using task networks 604 and 612 without any intermediate encoding/decoding to an output generated with the intermediate encoding/decoding. As with distortion, the task performance measurement may be communicated to the first device so that the first device may select the appropriate model based on the task performance (or difference in task performance), or the second device may select the appropriate model based on the task performance and indicate the selection to the first device. Distortion, task performance, and other metrics may be used in combination to determine model parameters.

Additional or alternative metrics may be used by the first and/or second device in selecting a model for inference. For example, the cost of swapping models (e.g., the energy cost, time cost, memory cost, communication network bandwidth cost, etc.), the channel capacity, or the delay (e.g., the communication delay of communicating the encoded representations over communication network 608). The second device may indicate these metrics to the first device for the first device to determine parameters, or the second device may determine the parameters for the first device based on one or more of the metrics and indicate the selected parameters to the first device.

In an example, the task completed by task networks 604 and 612 may be generating bounding boxes around dogs found in an input image. The task performance change may be measured by comparing the change in bounding box locations with and without the intermediate encoding/decoding. Other metrics for task performance may include multiple object tracking accuracy (MoTA) or mean average precision (mAP).

In some aspects, the first device may also consider any cost associated with model switching when determining to switch between models as indicated by the second device. For example, the first device may wait until it received a preconfigured number of indications of a set of model parameters before changing to those model parameters as a form of hysteresis to avoid undue model switching.

In some aspects, the first device and/or second device may determine which model to use for their respective parts of the task network based on the encoder 606 configuration and/or decoder 610 configuration. The first device may indicate encoder 606 configuration information to the second device. The second device may indicate decoder configuration information to the first device. The first device may configure the encoder 606 with an encoder configuration based on information about the distortions, a change in task performance, a complexity for the encoder configuration, network conditions, performance requirements, communication network delay, packet loss rate, etc. Similarly, the second device may configure the decoder 610 with a decoder configuration based on information about the distortions, a change in task performance, a complexity for the decoder configuration, network conditions, performance requirements, communication network delay etc.

In some aspects, the first device configures encoder 606 with an encoder configuration based on information about the distortions or change in task performance (e.g., as measured as described above). The configuration may be based on computing complexity for an encoder-decoder configuration for multiple pairs of sets of parameters, a pair consisting of a set of parameters for part 1 of the task network (task network 604) and a set of parameters for part 2 of the task network (task network 612) based on testing data. In some aspects, the testing data is in the form of a table. In some aspects, the information used for determining the encoder configuration may be received by the first device from the second device, or a network entity, e.g., a server, an operation administration and management "OAM" entity in a cellular network, etc. The encoder configuration may be based on network conditions such as bit rate, error rate, etc. The encoder configuration may be based on the performance requirements such as the time to complete the task.

In some aspects, model parameters for the first device (e.g., the selection between model 604a and 604b) may be based on the encoder configuration. For example, the first device may store a table that associated encoder configuration parameters with model parameters. The model parameters may be based on decoder configuration information received from the second device.

In some aspects, the second device configures decoder 610 with a decoder configuration based on information about the distortions or change in task performance (e.g., as measured as described above). The configuration may be based on computing complexity for an encoder-decoder configuration for multiple pairs of sets of parameters, a pair consisting of a set of parameters for part 1 of the task network (task network 604) and a set of parameters for part 2 of the task network (task network 612) based on testing data. In some aspects, the testing data is in the form of a table. In some aspects, the information used for determining the decoder configuration may be received by the second device from the first device, or a network entity, e.g., a server, an operation administration and management "OAM" entity in a cellular network, etc. The decoder configuration may be based on network conditions such as bit rate, error rate, etc. The decoder configuration may be based on the performance requirements such as the time to complete the task.

In some aspects, model parameters for the second device (e.g., the selection between model 612a and 612b) may be based on the decoder configuration. For example, the second device may store a table that associated decoder configuration parameters with model parameters. The model parameters may be based on encoder configuration information received from the first device.

Figure 7A:
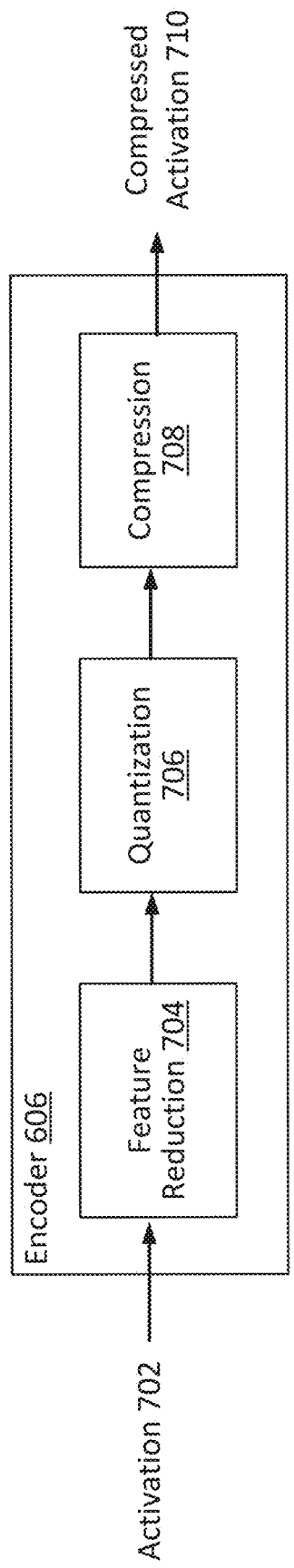
FIG. 7A illustrates a simplified diagram of an encoder structure according to one or more aspects of the present disclosure.

FIG. 7A illustrates a simplified diagram of an encoder 606 structure according to one or more aspects of the present disclosure. Encoder 606 may receive an activation 702 (or vector representation, intermediate representation, feature map, etc.) and generate a compressed activation 710. Encoder 606 may perform a number of operations on activation 702, which may be performed in the order shown, or in a different order. Operations may also overlap or be omitted, etc. The operations performed may change over time as the encoder 606 is reconfigured, for example based on network characteristics.

In some aspects, encoder 606 performs feature reduction 704. Feature reduction 704 may drop values from activation 702. For example, if activation 702 is a vector of numbers, then some of the numbers in the vector may be dropped resulting in a shorter or sparser vector. The feature reduction level may be configurable such that no feature reduction occurs, or some variable amount of feature reduction occurs (e.g., dropping every third entry). In some aspects, feature reduction 704 is performed using principal component analysis. In some aspects, feature reduction 704 may vary the number of eigenvectors. In some aspects, feature reduction 704 includes temporal downsampling. In some aspects, feature reduction 704 includes spatial downsampling.

In some aspects, encoder 606 performs quantization 706 on activation 702. This may include reducing the number of bits used to represent each value in activation 702. For example, if activation 702 is a vector of 16-bit numbers, quantization 706 may quantize the vector so that it is a vector of 8-bit numbers. The amount of quantization may be configured as described herein. In some aspects, quantization may be configured to results in values of 32 bits, 24 bits, 16 bits, 8 bits, or 4 bits.

In some aspects, encoder 606 may perform compression 708 on activation 702. Compression 708 may be any other form of compression that may be performed. For example, a sparse frequency-domain representation may be utilized by compression 708 to compress an image-related activation 702. In some aspects, the compression 708 may be configured by configuring a compression ratio.

Figure 7B:
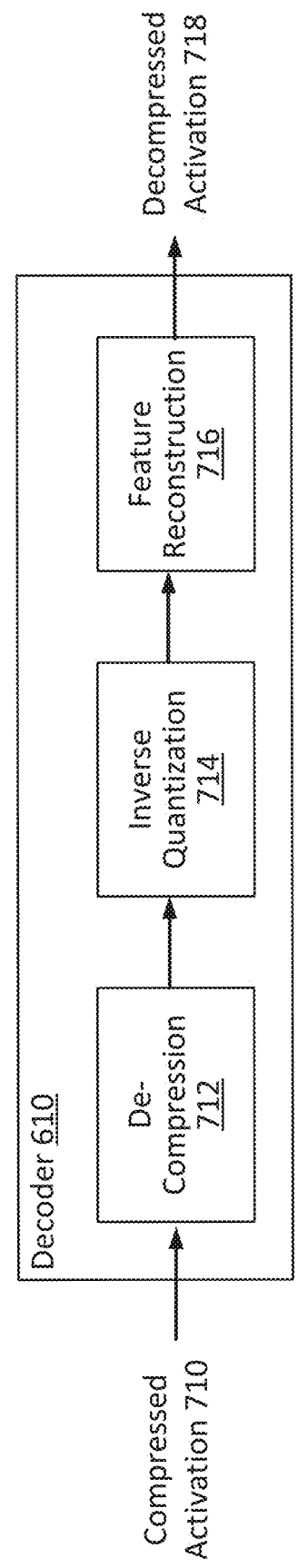
FIG. 7B illustrates a simplified diagram of a decoder structure according to one or more aspects of the present disclosure.

FIG. 7B illustrates a simplified diagram of a decoder 610 structure according to one or more aspects of the present disclosure. Decoder 610 may receive a compressed activation 710 (or vector representation, intermediate representation, feature map, etc.) and generate a decompressed activation 718. Decoder 610 may perform a number of operations on activation compressed activation 710, which may be performed in the order shown, or in a different order. Operations may also overlap or be omitted, etc. The operations performed may change over time as the decoder 610 is reconfigured, for example based on network characteristics.

In some aspects, decoder 610 may perform decompression 712 on compressed activation 710. Decompression 712 may be the inverse operation of compression 708. Decompression 712 may produce an imperfect (i.e. lossy) reconstruction of the activation 702 before compression 708.

In some aspects, decoder 610 performs inverse quantization 714 on compressed activation 710. This may include increasing the number of bits used to represent each value in compressed activation 710. For example, if compressed activation 710 is a vector of 8-bit numbers, inverse quantization 714 may change the vector so that it is a vector of 16-bit numbers (e.g., by zero-padding, interpolating, etc.). The amount of inverse quantization may be configured as described herein. Inverse quantization 714 may produce an imperfect (i.e. lossy) reconstruction of the activation 702 before quantization 706.

In some aspects, decoder 610 performs feature reconstruction 716. Feature reconstruction 716 may be the inverse operation of feature reduction 704, increasing the number of features (e.g., vector values). For example, if compressed activation 710 is a vector of numbers, then additional numbers may be concatenated (at the end or interspersed) with compressed activation 710 so that the vector length is the same as activation 702. The feature reconstruction level may be configurable as described herein. Feature reconstruction 716 may produce an imperfect (i.e. lossy) reconstruction of the activation 702 before feature reduction 704.

Figure 8A:
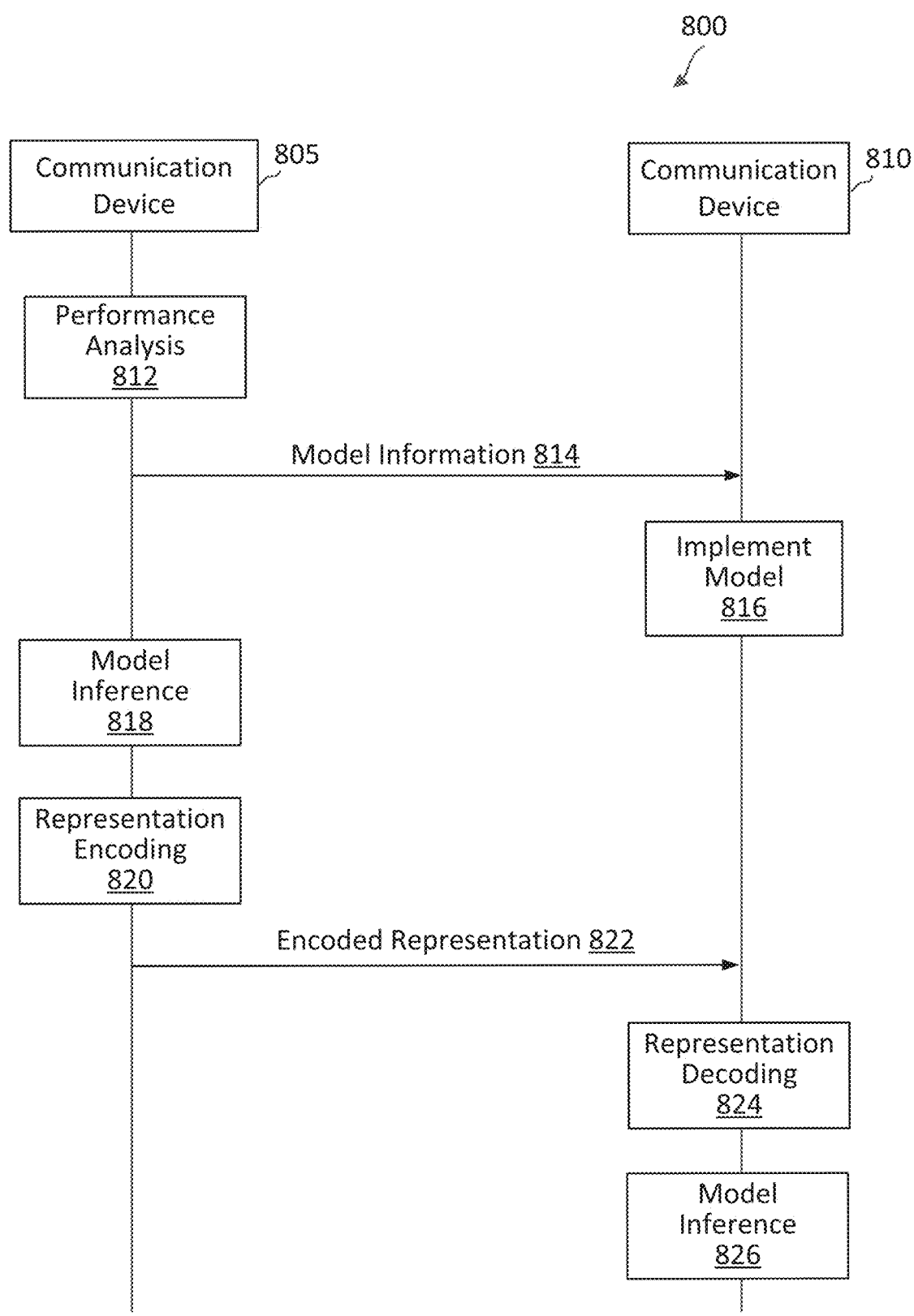
FIGS. 8A-8C illustrate signaling diagrams for model selection schemes for split inference according to one or more aspects of the present disclosure.
Figure 8B:
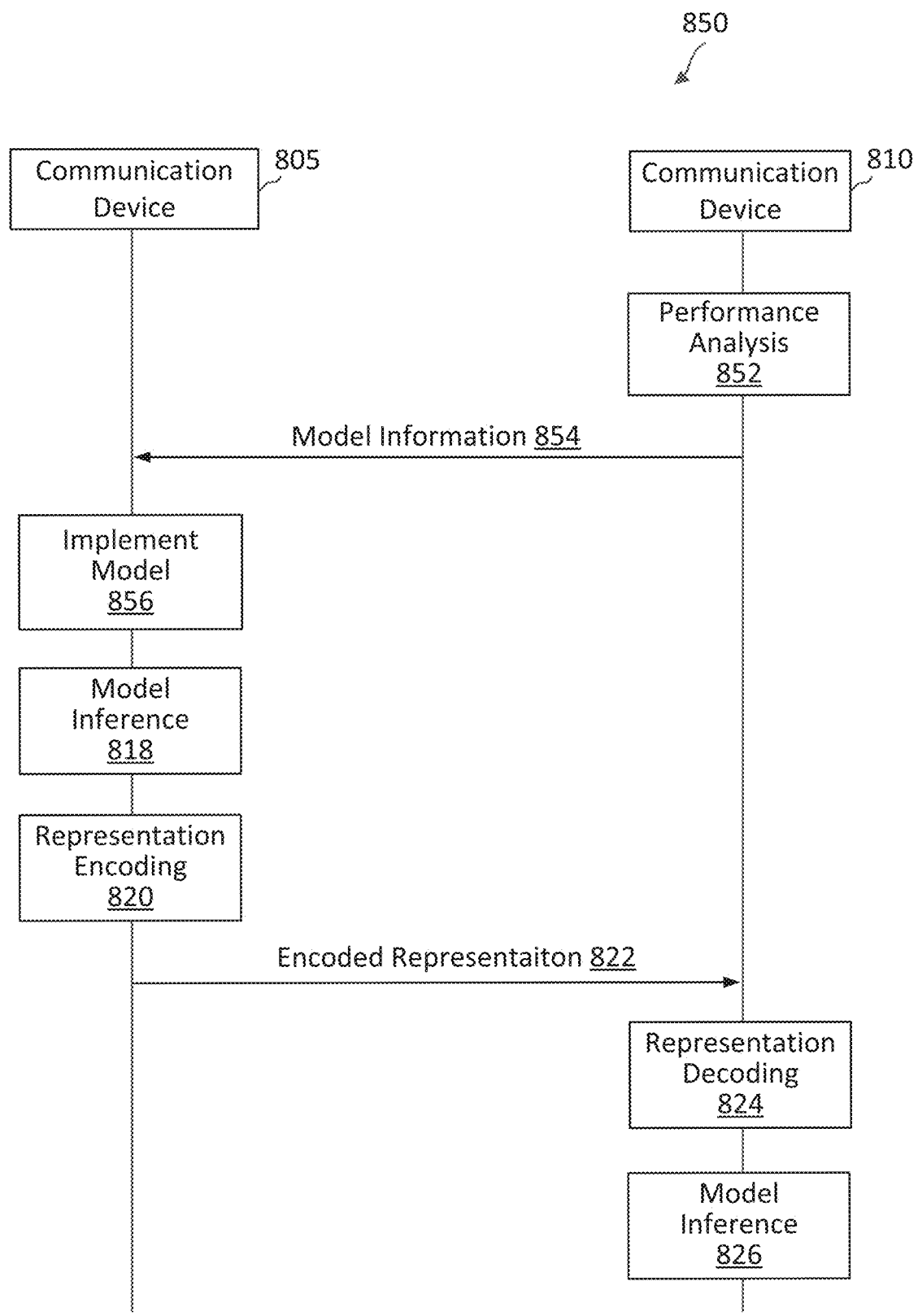
Figure 8C:
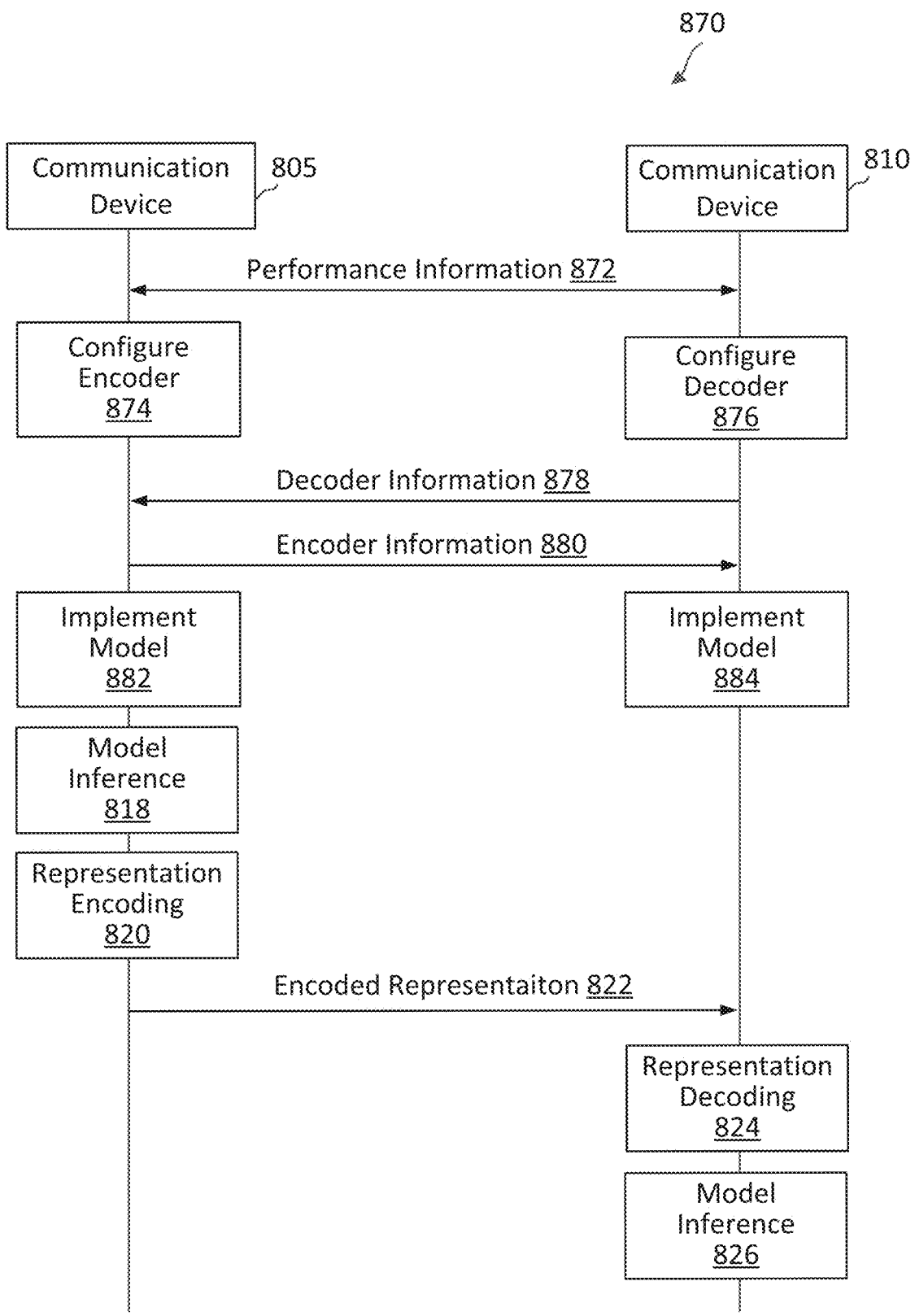

FIGS. 8A-8C illustrate signaling diagrams for model selection schemes for split inference according to one or more aspects of the present disclosure. The model selection schemes illustrate aspects of timelines for model selection and inference across devices on a network in accordance with the present disclosure. Aspects of the model selection scheme 800 may be utilized in the context of the wireless communication network 100 as well as with other aspects of the present disclosure, including the frameworks described in FIGS. 6-7B. For example, communication device 805 may be a UE (e.g., UE 115 or UE 900) or a network entity (e.g., BS 105 or network unit 1000). Endpoint 810 may similarly be a UE (e.g., UE 115 or UE 900) or a network entity (e.g., BS 105 or network unit 1000). Communication device 805 may include a first task network (e.g., task network 604) and an encoder (e.g., encoder 606). Endpoint 810 may include a second task network (e.g., task network 612) and a decoder (e.g., decoder 610). Some actions are substantially similar across the schemes of FIGS. 8A-8C and are referenced using the same number to indicate this similarity, while the specifics such as specific model parameters selected may differ depending on the scheme.

In some aspects the schemes described in FIGS. 8A-8C may be performed by the same devices at different times based on a configuration of communication device 805 and/or 810. For example, communication device 805 may be configured to perform model selection via scheme 800, and may be reconfigured via a configuration parameter to perform model selection via scheme 850. Likewise for communication device 810.

FIG. 8A illustrates a signaling diagram for model selection scheme 800 according to one or more aspects of the present disclosure.

At action 812, communication device 805 performs performance analysis. Performance analysis 812 may include, for example, a distortion measurement, a task performance measurement, network characteristics measurements, etc. Performance analysis may be performed as described with reference to FIG. 6.

At action 814, communication device 805 transmits model information to communication device 810. Model information may include information determined in performance analysis at action 812 such as distortion or task performance metrics. In some aspects, model information includes an indication of a set of parameters for communication device 810.

At action 816, communication device 810 implements a model based on model information 814. For example, a set of parameters may be selected based on a table that is indexed by information in model information 814. The set of parameters may be a pre-trained set of parameters optimized for the present conditions. Implementing the model may include retrieving model parameters from memory or from a remote network device and loading them into the task network. Parameters may include weights and biases, kernel values, and may also include a model depth, or some other indication of a split point or split points for the model that is made up of the models on each of the communication devices 805 and 810. In some aspects, the model is only swapped after a determination that it is worth the swapping cost. This determination may be based on the level of distortion or task performance, the number of times that a model is indicated by communication device 805, etc.

At action 818, communication device 805 performs model inference using a first task network to generate an intermediate representation based on an input. The first task network may be selected/implemented by communication device 805 based on the same or different considerations as used by communication device 810. Model inference may be performed using an input data such as an input image. Input data may be received from a third device, from the communication device 810, or may be generated locally or entered via a user interface associated with communication device 805.

At action 820, communication device 805 encodes (e.g., via an encoder 606) the intermediate representation generated by model inference at action 818. Encoder may be configured with parameters as determined based on performance analysis 812.

At action 822, communication device 805 transmits the encoded representation to communication device 810. This may be performed via a communication network such as a 5G NR cellular network, a WiFi network, a wired network, a system bus, a Bluetooth connection, etc.

At action 824, communication device 810 decodes the intermediate representation via a decoder (e.g., decoder 610). Decoder parameters may be configured based on model information 814.

At action 826, communication device 826 completes model inference with the model implemented at action 816 using the decoded intermediate representation as input and generating an output. The output may be used by communication device 810 in some function. In some aspects, the output may be displayed to a user (e.g., as a video or image). In some aspects, the output may be an audio that is played via communication device 810 or an associated speaker.

FIG. 8B illustrates a signaling diagram for model selection scheme 850 according to one or more aspects of the present disclosure.

At action 852, communication device 810 performs performance analysis. Performance analysis 852 may include, for example, a distortion measurement, a task performance measurement, network characteristics measurements, etc. Performance analysis may be performed as described with reference to FIG. 6.

At action 854, communication device 810 transmits model information to communication device 805. Model information may include information determined in performance analysis at action 852 such as distortion or task performance metrics. In some aspects, model information includes an indication of a set of parameters for communication device 805.

At action 856, communication device 805 implements a model based on model information 854. For example, a set of parameters may be selected based on a table that is indexed by information in model information 854. The set of parameters may be a pre-trained set of parameters optimized for the present conditions. Implementing the model may include retrieving model parameters from memory or from a remote network device and loading them into the task network. Parameters may include weights and biases, kernel values, and may also include a model depth, or some other indication of a split point or split points for the model that is made up of the models on each of the communication devices 805 and 810. In some aspects, the model is only swapped after a determination that it is worth the swapping cost. This determination may be based on the level of distortion or task performance, the number of times that a model is indicated by communication device 810, etc. In some aspects, communication device 810 may determine model parameters for its task network also based on performance analysis 852.

Actions 818, 820, 822, 824, and 826 are performed substantially as described with reference to FIG. 8A.

FIG. 8C illustrates a signaling diagram for model selection scheme 870 according to one or more aspects of the present disclosure.

At action 872, performance information is shared between communication device 805 and communication device 810. Performance information may include a distortion measurement, a task performance measurement, network characteristics measurements, etc. Performance analysis may be performed as described with reference to FIG. 6.

At action 874, communication device 805 configures an encoder (e.g., encoder 606) based on performance information 872. Encoder configuration may include configuring a feature reduction configuration, a quantization configuration, and/or a compression configuration.

At action 876, communication device 810 configures a decoder (e.g., decoder 610) based on performance information 872. Decoder configuration may include configuring a feature reconstruction configuration, an inverse quantization configuration, and/or a decompression configuration.

At action 878, communication device 810 transmits decoder configuration information to communication device 805.

At action 880, communication device 805 transmits encoder configuration information to communication device 810.

At action 882, communication device 805 implements a model based on the encoder configuration and/or the decoder configuration. For example, a set of parameters may be selected based on a table that is indexed by information in the encoder and/or decoder configuration. The set of parameters may be a pre-trained set of parameters optimized for the present conditions. For example, the models may be trained with different encoder/decoder configurations so that they are optimized for those configurations. Implementing the model may include retrieving model parameters from memory or from a remote network device and loading them into the task network. Parameters may include weights and biases, kernel values, and may also include a model depth, or some other indication of a split point or split points for the model that is made up of the models on each of the communication devices 805 and 810. In some aspects, the model is only swapped after a determination that it is worth the swapping cost. This determination may be based on the level of distortion or task performance, the amount of time that the encoder/decoder configurations have been kept unchanged, etc.

At action 884, communication device 810 implements a model based on the encoder configuration and/or the decoder configuration. For example, a set of parameters may be selected based on a table that is indexed by information in the encoder and/or decoder configuration. The set of parameters may be a pre-trained set of parameters optimized for the present conditions. For example, the models may be trained with different encoder/decoder configurations so that they are optimized for those configurations. Implementing the model may include retrieving model parameters from memory or from a remote network device and loading them into the task network. Parameters may include weights and biases, kernel values, and may also include a model depth, or some other indication of a split point or split points for the model that is made up of the models on each of the communication devices 805 and 810. In some aspects, the model is only swapped after a determination that it is worth the swapping cost. This determination may be based on the level of distortion or task performance, the amount of time that the encoder/decoder configurations have been kept unchanged, etc.

Actions 818, 820, 822, 824, and 826 are performed substantially as described with reference to FIG. 8A.

Figure 9:
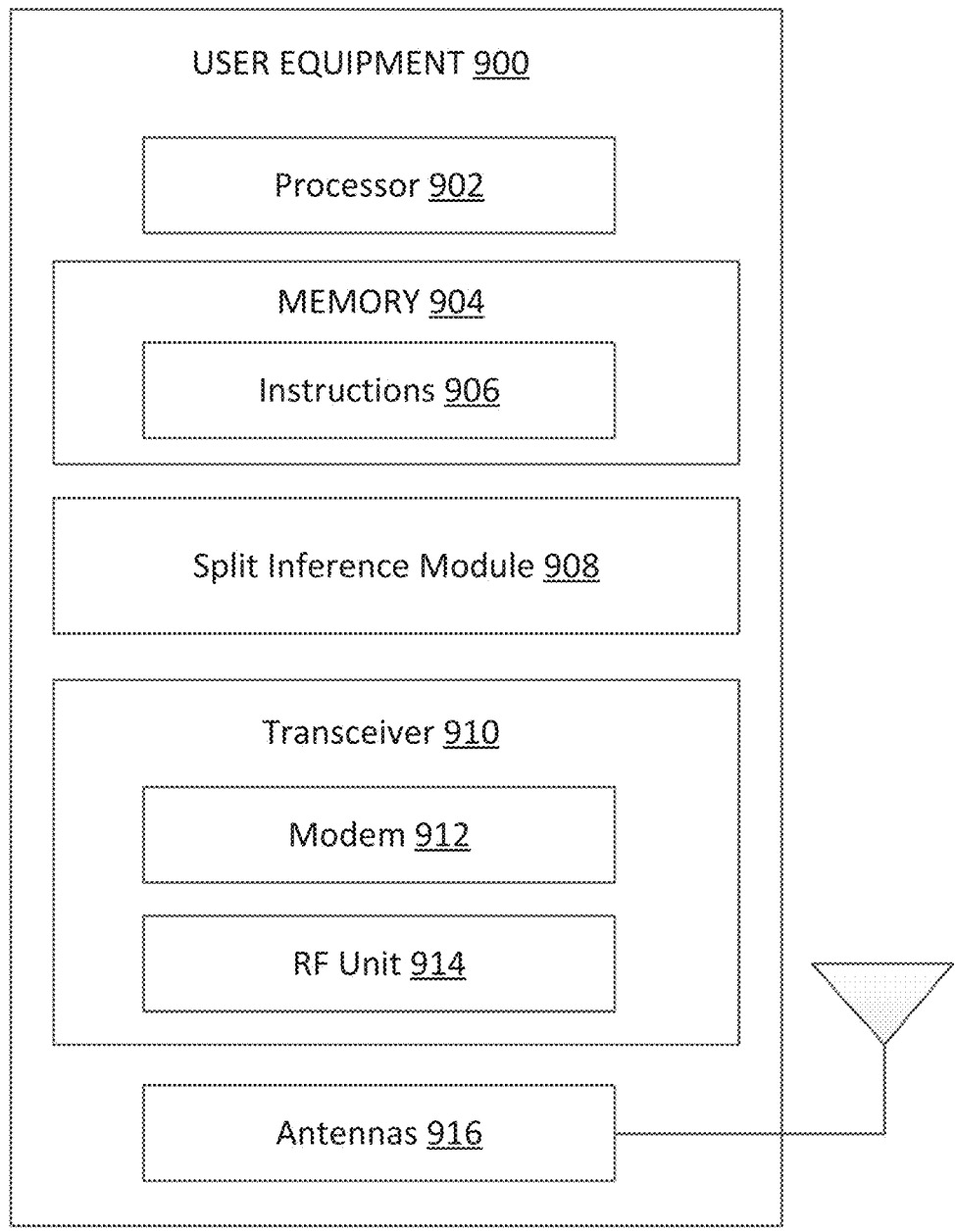
FIG. 9 illustrates a block diagram of a user equipment (UE) according to one or more aspects of the present disclosure.

FIG. 9 is a block diagram of a UE 900 according to one or more aspects of the present disclosure. The UE 900 may be, for instance, a UE 115 as discussed in FIGS. 1-8C. As shown, the UE 900 may include a processor 902, a memory 904, a split inference module 908, a transceiver 910 including a modem subsystem 912 and an RF unit 914, and one or more antennas 916. These elements may be coupled with one another. The term "coupled" may refer to directly or indirectly coupled or connected to one or more intervening elements. For instance, these elements may be in direct or indirect communication with each other, for instance via one or more buses.

The processor 902 may include a CPU, a DSP, an ASIC, a controller, a FPGA device, another hardware device, a firmware device, or any combination thereof configured to perform the operations described herein. The processor 902 may also be implemented as a combination of computing devices, e.g., a combination of a DSP and a microprocessor, a plurality of microprocessors, one or more microprocessors in conjunction with a DSP core, or any other such configuration.

The memory 904 may include a cache memory (e.g., a cache memory of the processor 902), RAM, MRAM, ROM, PROM, EPROM, EEPROM, flash memory, solid state memory device, hard disk drives, other forms of volatile and non-volatile memory, or a combination of different types of memory. In an aspect, the memory 904 includes a non-transitory computer-readable medium. The memory 904 may store, or have recorded thereon, instructions 906. The instructions 906 may include instructions that, when executed by the processor 902, cause the processor 902 to perform the operations described herein with reference to a UE 115 in connection with aspects of the present disclosure, for instance, aspects of FIGS. 3-8C. Instructions 906 may also be referred to as program code. The program code may be for causing a wireless communication device to perform these operations, for instance by causing one or more processors (such as processor 902) to control or command the UE 900 to do so. The terms "instructions" and "code" should be interpreted broadly to include any type of computer-readable statement(s). For instance, the terms "instructions" and "code" may refer to one or more programs, routines, sub-routines, functions, procedures, etc. "Instructions" and "code" may include a single computer-readable statement or many computer-readable statements.

The split inference module 908 may be implemented via hardware, software, or combinations thereof. For instance, the split inference module 908 may be implemented as a processor, circuit, and/or instructions 906 stored in the memory 904 and executed by the processor 902. In some aspects, the split inference module 908 can be integrated within the modem subsystem 912. For instance, the split inference module 908 can be implemented by a combination of software components (e.g., executed by a DSP or a general processor) and hardware components (e.g., logic gates and circuitry) within the modem subsystem 912. The split inference module 908 may communicate with one or more components of the UE 900 to implement various aspects of the present disclosure, for instance, aspects of FIGS. 3-8C and 11-13.

In some aspects, the split inference module 908 may be configured, along with other components of the UE 900, to perform performance analysis including determining distortion and/or task performance as described with respect to FIGS. 6-8C. Split inference module 908 may also be configured to determine model parameters for a task network based on performance information, encoder configuration, decoder configuration, network characteristics, or other metrics as described with respect to FIGS. 6-8C. The model parameters may be determined based on an index to a table associated with pretrained model parameters. Split inference module 908 may be configured to transmit model information to another device as described with respect to FIGS. 6-8C. Split inference module 908 may further be configured to implement a selected model, for example by swapping parameters in a task network as described with respect to FIGS. 6-8C. Split inference module 908 may further be configured to perform inference on input data using the implemented model to generate intermediate representations as described with respect to FIGS. 6-8C. Split inference module 908 may further be configured to encode the generated intermediate representations using an encoder configuration that may be determined based on performance metrics as described with respect to FIGS. 6-8C. Split inference module 908 may further be configured to transmit the encoded information to another device (e.g., another UE 900, a BS 105, a network unit 1000, or other device).

In some aspects, split inference module 908 may be configured to receive model information, and implement a model based on the received information as described with respect to FIGS. 6-8C. In some aspects, split inference module 908 is further configured to receive encoded intermediate representations, and decode the intermediate representations via a decoder (e.g., decoder 610) with a decoder configuration as described with respect to FIGS. 6-8C. The decoder configuration may be configured based on model information. In some aspects, split inference module 908 may be configured to perform inference using the decoded intermediate representation as input to generate an output using the implemented model as described with respect to FIGS. 6-8C. In some aspects, split inference module 908 may be configured to display or otherwise present the generated output via a user interface.

As shown, the transceiver 910 may include the modem subsystem 912 and the RF unit 914. The transceiver 910 can be configured to communicate bi-directionally with other devices, such as the BSs 105 and/or network units. The modem subsystem 912 may be configured to modulate and/or encode the data from the memory 904 and/or the split inference module 908 according to a MCS, e.g., a LDPC coding scheme, a turbo coding scheme, a convolutional coding scheme, a digital beamforming scheme, etc. The RF unit 914 may be configured to process (e.g., perform analog to digital conversion or digital to analog conversion, etc.) modulated/encoded data (e.g., communication signals, data signals, control signals, indications for model selection, indications of specific model parameters, intermediate representations such as vector representations activations or feature maps, etc.) from the modem subsystem 912 (on outbound transmissions). The RF unit 914 may be further configured to perform analog beamforming in conjunction with the digital beamforming. Although shown as integrated together in transceiver 910, the modem subsystem 912 and the RF unit 914 may be separate devices that are coupled together at the UE 900 to enable the UE 900 to communicate with other devices.

The RF unit 914 may provide the modulated and/or processed data, e.g., data packets (or, more generally, data messages that may contain one or more data packets and other information), to the antennas 916 for transmission to one or more other devices. The antennas 916 may further receive data messages transmitted from other devices. The antennas 916 may provide the received data messages for processing and/or demodulation at the transceiver 910. The transceiver 910 may provide the demodulated and decoded data (e.g., communication signals, data signals, control signals, indications for model selection, indications of specific model parameters, intermediate representations such as vector representations activations or feature maps etc.) to the split inference module 908 for processing. The antennas 916 may include multiple antennas of similar or different designs in order to sustain multiple transmission links.

Figure 10:
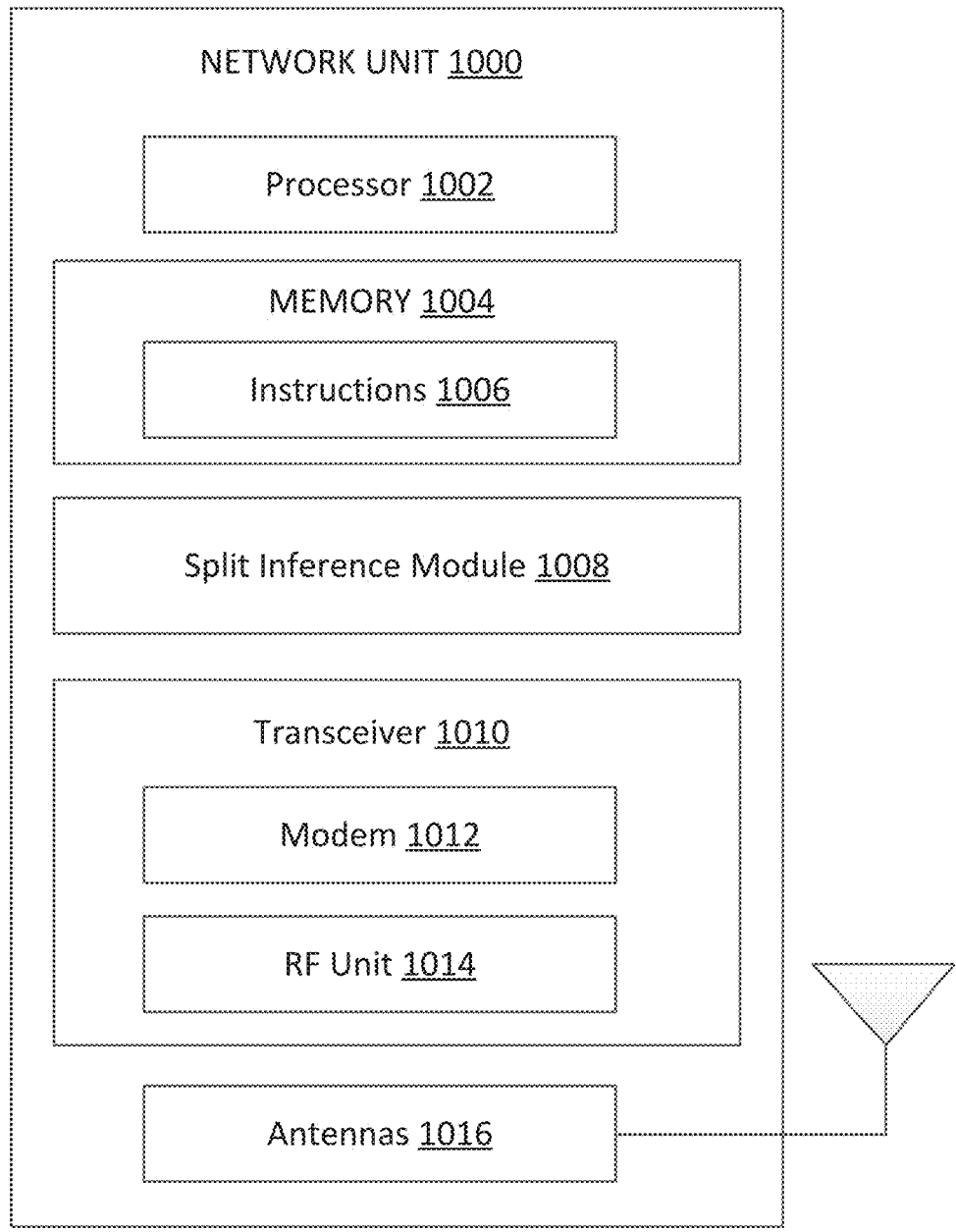
FIG. 10 illustrates a block diagram of a network unit according to one or more aspects of the present disclosure.

FIG. 10 is a block diagram of a network unit 1000 according to one or more aspects of the present disclosure. The network unit 1000 may be a BS 105, CU 210, DU 230, and/or RU 240 as discussed in FIGS. 1-8C. Accordingly, the network unit 1000 may include a BS. The BS may be an aggregated BS or a disaggregated BS, as described above. As shown, the network unit 1000 may include a processor 1002, a memory 1004, a split inference module 1008, a transceiver 1010 including a modem subsystem 1012 and a radio frequency (RF) unit 1014, and one or more antennas 1016. These elements may be coupled with one another. The term "coupled" may refer to directly or indirectly coupled or connected to one or more intervening elements. For instance, these elements may be in direct or indirect communication with each other, for instance via one or more buses.

The processor 1002 may have various features as a specific-type processor. For instance, these may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 1002 may also be implemented as a combination of computing devices, e.g., a combination of a DSP and a microprocessor, a plurality of microprocessors, one or more microprocessors in conjunction with a DSP core, or any other such configuration.

The memory 1004 may include a cache memory (e.g., a cache memory of the processor 1002), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, a solid state memory device, one or more hard disk drives, memristor-based arrays, other forms of volatile and non-volatile memory, or a combination of different types of memory. In some aspects, the memory 1004 may include a non-transitory computer-readable medium. The memory 1004 may store instructions 1006. The instructions 1006 may include instructions that, when executed by the processor 1002, cause the network unit 1000 to perform operations described herein, for instance, aspects of FIGS. 3-8C and 11-13. Instructions 1006 may also be referred to as program code. The program code may be for causing a wireless communication device to perform these operations, for instance by causing one or more processors (such as processor 1002) to control or command the network unit 1000 to do so. The terms "instructions" and "code" should be interpreted broadly to include any type of computer-readable statement(s). For instance, the terms "instructions" and "code" may refer to one or more programs, routines, sub-routines, functions, procedures, etc. "Instructions" and "code" may include a single computer-readable statement or many computer-readable statements.

The split inference module 1008 may be implemented via hardware, software, or combinations thereof. For instance, the split inference module 1008 may be implemented as a processor, circuit, and/or instructions 1006 stored in the memory 1004 and executed by the processor 1002. In some instances, the split inference module 1008 can be integrated within the modem subsystem 1012. For instance, the split inference module 1008 can be implemented by a combination of software components (e.g., executed by a DSP or a general processor) and hardware components (e.g., logic gates and circuitry) within the modem subsystem 1012. The split inference module 1008 may communicate with one or more components of the network unit 1000 to implement various aspects of the present disclosure, for instance, aspects of FIGS. 3-8C.

In some aspects, the split inference module 1008 may be configured, along with other components of the network unit 1000, to perform performance analysis including determining distortion and/or task performance as described with respect to FIGS. 6-8C. Split inference module 1008 may also be configured to determine model parameters for a task network based on performance information, encoder configuration, decoder configuration, network characteristics, or other metrics as described with respect to FIGS. 6-8C. The model parameters may be determined based on an index to a table associated with pretrained model parameters. Split inference module 1008 may be configured to transmit model information to another device as described with respect to FIGS. 6-8C. Split inference module 1008 may further be configured to implement a selected model, for example by swapping parameters in a task network as described with respect to FIGS. 6-8C. Split inference module 1008 may further be configured to perform inference on input data using the implemented model to generate intermediate representations as described with respect to FIGS. 6-8C. Split inference module 1008 may further be configured to encode the generated intermediate representations using an encoder configuration that may be determined based on performance metrics as described with respect to FIGS. 6-8C. Split inference module 1008 may further be configured to transmit the encoded information to another device (e.g., a UE 900, a BS 105, another network unit 1000, or other device).

In some aspects, split inference module 1008 may be configured to receive model information, and implement a model based on the received information as described with respect to FIGS. 6-8C. In some aspects, split inference module 1008 is further configured to receive encoded intermediate representations, and decode the intermediate representations via a decoder (e.g., decoder 610) with a decoder configuration as described with respect to FIGS. 6-8C. The decoder configuration may be configured based on model information. In some aspects, split inference module 1008 may be configured to perform inference using the decoded intermediate representation as input to generate an output using the implemented model as described with respect to FIGS. 6-8C. In some aspects, split inference module 1008 may be configured to display or otherwise present the generated output via a user interface.

As shown, the transceiver 1010 may include the modem subsystem 1012 and the RF unit 1014. The transceiver 1010 can be configured to communicate bi-directionally with other devices, such as the UE 115, UE 900, and/or another network unit. The modem subsystem 1012 may be configured to modulate and/or encode data according to a modulation and coding scheme (MCS), e.g., a low-density parity check (LDPC) coding scheme, a turbo coding scheme, a convolutional coding scheme, a digital beamforming scheme, etc. The RF unit 1014 may be configured to process (e.g., perform analog to digital conversion or digital to analog conversion, etc.) modulated/encoded data (e.g., communication signals, data signals, control signals, indications for model selection, indications of specific model parameters, intermediate representations such as vector representations activations or feature maps, etc.) from the modem subsystem 1012 (on outbound transmissions). The RF unit 1014 may be further configured to perform analog beamforming in conjunction with the digital beamforming. Although shown as integrated together in transceiver 1010, the modem subsystem 1012, and/or the RF unit 1014 may be separate devices that are coupled together at the network unit 1000 to enable the network unit 1000 to communicate with other devices.

The RF unit 1014 may provide the modulated and/or processed data, e.g., data packets (or, more generally, data messages that may contain one or more data packets and other information), to the antennas 1016 for transmission to one or more other devices. The antennas 1016 may further receive data messages transmitted from other devices and provide the received data messages for processing and/or demodulation at the transceiver 1010. The transceiver 1010 may provide the demodulated and decoded data (e.g., communication signals, data signals, control signals, indications for model selection, indications of specific model parameters, intermediate representations such as vector representations activations or feature maps, etc.) to the split inference module 1008 for processing. The antennas 1016 may include multiple antennas of similar or different designs in order to sustain multiple transmission links.

Figure 11:
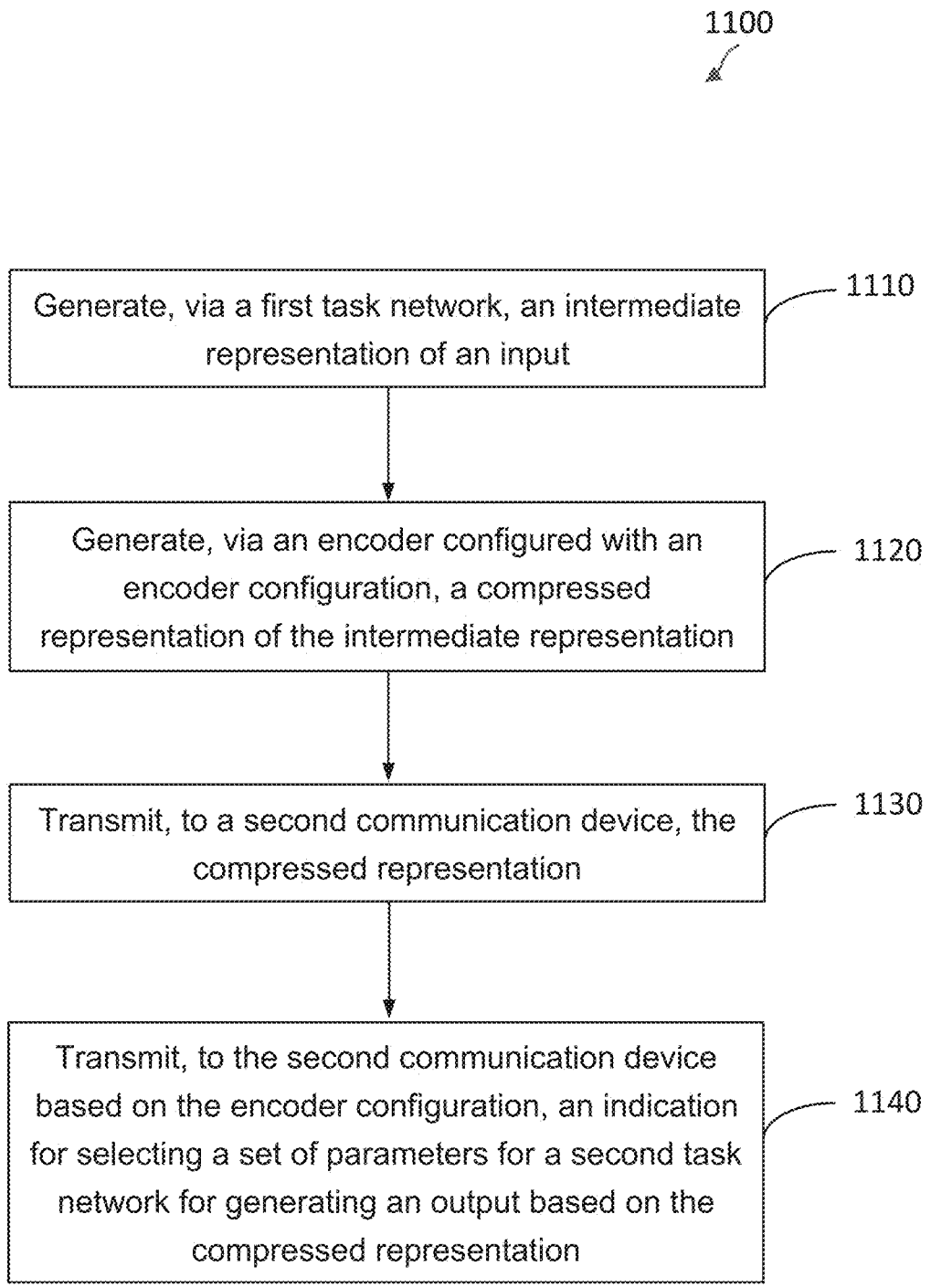
FIG. 11 illustrates a flow diagram of a communication method according to some aspects of the present disclosure.

FIG. 11 is a flow diagram illustrating a communication method 1100 according to one or more aspects of the present disclosure. Aspects of the method 1100 can be executed by a computing device (e.g., a processor, processing circuit, and/or other suitable component) of a first communication device or other suitable means for performing the blocks. For instance, the first communication device may be a UE (e.g., UE 115 or UE 900). The UE may utilize one or more components, such as the processor 902, the memory 904, the ML beam prediction module 908, the transceiver 910, the modem subsystem 912, the RF unit 914, and/or the one or more antennas 916, to execute the blocks of method 1100. In some aspects the first communication device may be a network entity (e.g., BS 105 or network unit 1000). The network unit may utilize one or more components, such as the processor 1002, the memory 1004, the ML beam prediction module 1008, the transceiver 1010, the modem subsystem 1012, the RF unit 1014, and/or the one or more antennas 1016, to execute the blocks of method 1100. The method 1100 may employ similar mechanisms as described in FIGS. 3-8C. As illustrated, the method 1100 includes a number of enumerated blocks, but aspects of the method 1100 may include additional blocks before, after, and in between the enumerated blocks. In some aspects, one or more of the enumerated blocks may be omitted or performed in a different order. Aspects of methods 1200 and/or 1300 may be used interchangeably with aspects of method 1100.

At block 1110, the first communication device generates, via a first task network (e.g., task network 604), an intermediate representation of an input. In some aspects, the generating the intermediate representation is performed using a depth of the first task network (e.g., a number of neural network layers). The indication may further be for selecting a depth of the second task network. For example, the first task network and the second task network may be considered together to be a full task network, and the relative depths of each of the first and second task networks may be modified such that the portion of the full task network performed by each device may be modified. The input may be, for example, an audio input, video input, image input, etc.

At block 1120, the first communication device generates, via an encoder (e.g., encoder 606) configured with an encoder configuration, a compressed representation of the intermediate representation. In some aspects, the depth of the first task network and/or the depth of the second task network may be based on the encoder configuration. In some aspects, the encoder configuration includes at least one of: a feature reduction configuration, a quantization configuration, or a compression configuration.

At block 1130, the first communication device transmits, to a second communication device, the compressed representation.

At block 1140, the first communication device transmits, to the second communication device based on the encoder configuration, an indication for selecting a set of parameters for a second task network for generating an output based on the compressed representation. In some aspects, the compressed representation and the indication are transmitted in-band within a same bitstream. In some aspects, the indication is transmitted out-of-band from the compressed representation. In some aspects, the indication includes a distortion level based on a difference between the intermediate representation and the compressed representation.

In some aspects, the first communication device generates, via a decoder, an uncompressed representation based on the compressed representation. The first communication device further generates, via the second task network configured with one or more sets of parameters, one or more outputs based on the uncompressed representation. The first communication device further generates, via the second task network, a baseline output based on the intermediate representation. In some aspects, the indication includes an indication of a change in task performance based on a comparison of the baseline output and the one or more outputs.

In some aspects, the indication includes an indication of a specific set of parameters. The specific set of parameters may be selected by the first communication device based on at least one of: a computed distortion level of the compressed representation, a computed change in task performance, a cost of swapping the second task network on the second communication device, a channel capacity between the first communication device and the second communication device, or a delay (e.g., the network delay in communication compressed representations).

Figure 12:
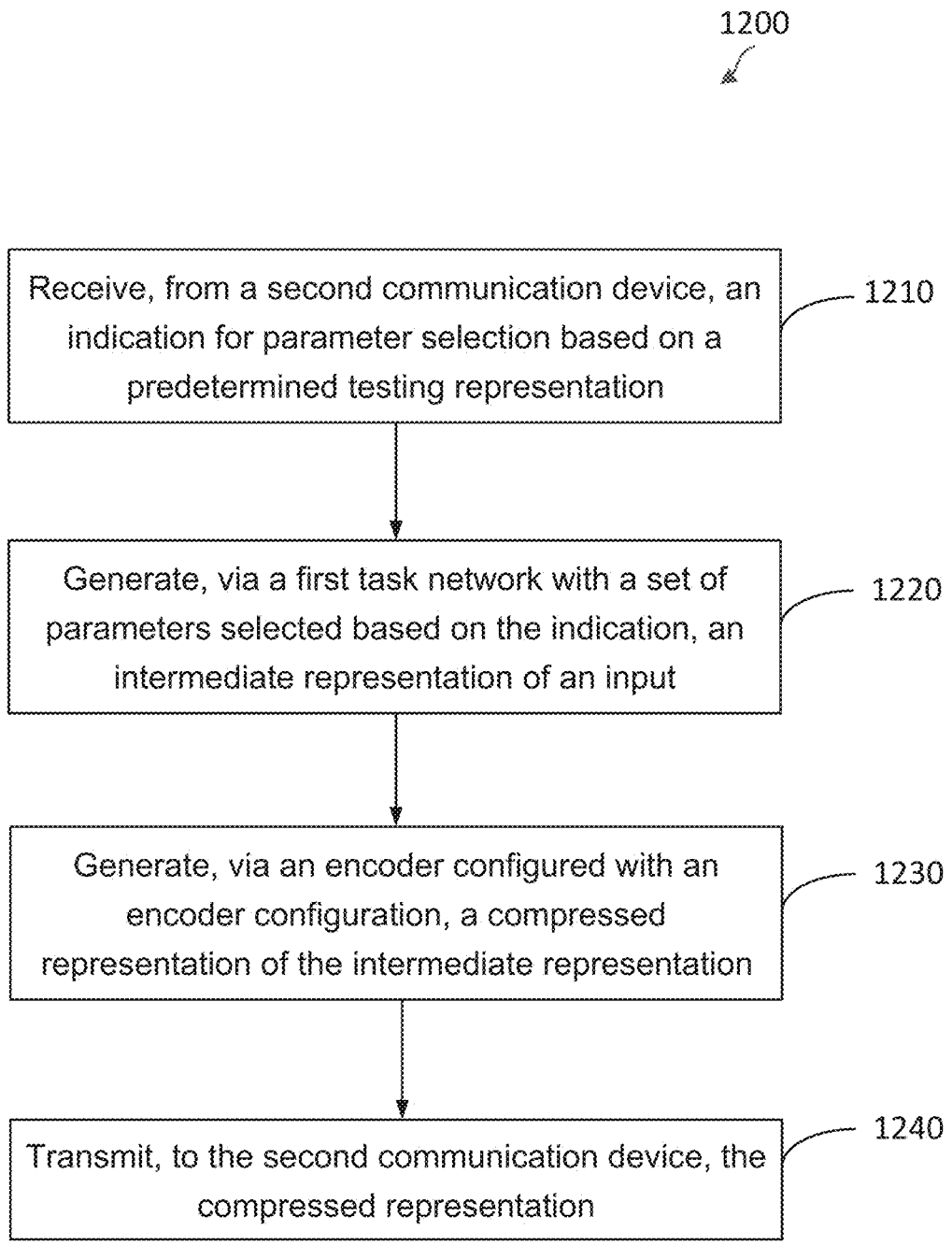
FIG. 12 illustrates a flow diagram of a communication method according to some aspects of the present disclosure.

FIG. 12 is a flow diagram illustrating a communication method 1200 according to one or more aspects of the present disclosure. Aspects of the method 1200 can be executed by a computing device (e.g., a processor, processing circuit, and/or other suitable component) of a first communication device or other suitable means for performing the blocks. For instance, the first communication device may be a UE (e.g., UE 115 or UE 900). The UE may utilize one or more components, such as the processor 902, the memory 904, the ML beam prediction module 908, the transceiver 910, the modem subsystem 912, the RF unit 914, and/or the one or more antennas 916, to execute the blocks of method 1200. In some aspects the first communication device may be a network entity (e.g., BS 105 or network unit 1000). The network unit may utilize one or more components, such as the processor 1002, the memory 1004, the ML beam prediction module 1008, the transceiver 1010, the modem subsystem 1012, the RF unit 1014, and/or the one or more antennas 1016, to execute the blocks of method 1200. The method 1200 may employ similar mechanisms as described in FIGS. 3-8C. As illustrated, the method 1200 includes a number of enumerated blocks, but aspects of the method 1200 may include additional blocks before, after, and in between the enumerated blocks. In some aspects, one or more of the enumerated blocks may be omitted or performed in a different order.

At block 1210, the first communication device receives, from a second communication device, an indication for parameter selection based on a predetermined testing representation. In some aspects, the indication includes an indication of a distortion level. In some aspects, the indication includes an indication of a change in task performance. In some aspects, the indication includes an indication of a specific set of parameters. For example, the sets of parameters may be indicated via reference to a preconfigured table, wherein the indication indicates the selected row of the table.

At block 1220, the first communication device generates, via a first task network (e.g., task network 604) with a set of parameters selected based on the indication, an intermediate representation of an input. In some aspects, the generating the intermediate representation is performed using a depth of the first task network (e.g., a number of neural network layers). The depth may be based on the indication. For example, the first task network and the second task network may be considered together to be a full task network, and the relative depths of each of the first and second task networks may be modified such that the portion of the full task network performed by each device may be modified. The input may be, for example, an audio input, video input, image input, etc.

At block 1230, the first communication device generates, via an encoder (e.g., encoder 606) configured with an encoder configuration, a compressed representation of the intermediate representation.

At block 1240, the first communication device transmits, to the second communication device, the compressed representation.

In some aspects, the first communication device configures the encoder with a second encoder configuration based on the indication. In some aspects, the first communication device transmits, to the second communication device, an indication of the second encoder configuration. In some aspects, the encoder configuration includes at least one of: a feature reduction configuration, a quantization configuration, or a compression configuration.

Figure 13:
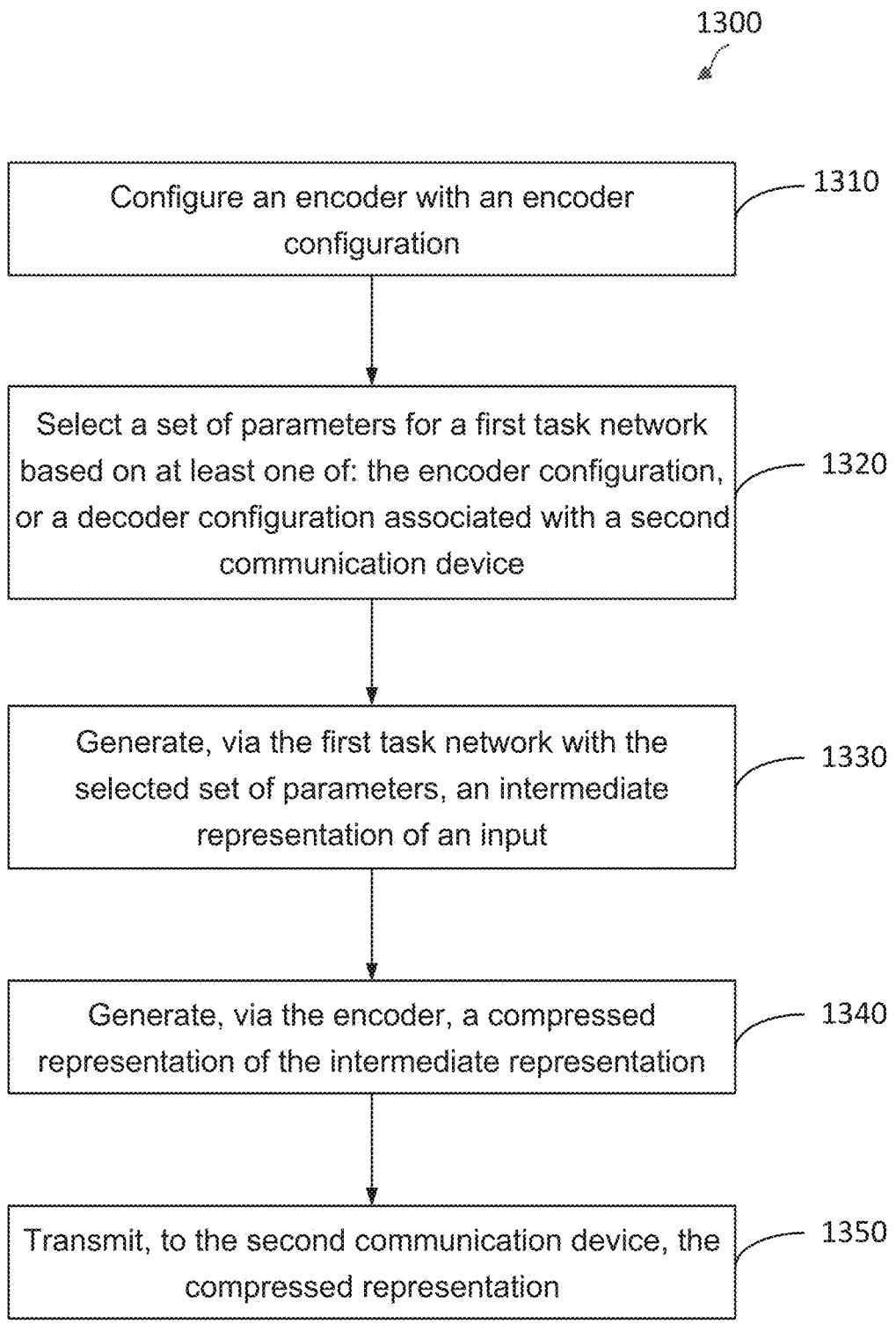
FIG. 13 illustrates a flow diagram of a communication method according to some aspects of the present disclosure.

FIG. 13 is a flow diagram illustrating a communication method 1300 according to one or more aspects of the present disclosure. Aspects of the method 1300 can be executed by a computing device (e.g., a processor, processing circuit, and/or other suitable component) of a first communication device or other suitable means for performing the blocks. For instance, the first communication device may be a UE (e.g., UE 115 or UE 900). The UE may utilize one or more components, such as the processor 902, the memory 904, the ML beam prediction module 908, the transceiver 910, the modem subsystem 912, the RF unit 914, and/or the one or more antennas 916, to execute the blocks of method 1300. In some aspects the first communication device may be a network entity (e.g., BS 105 or network unit 1000). The network unit may utilize one or more components, such as the processor 1002, the memory 1004, the ML beam prediction module 1008, the transceiver 1010, the modem subsystem 1012, the RF unit 1014, and/or the one or more antennas 1016, to execute the blocks of method 1300. The method 1300 may employ similar mechanisms as described in FIGS. 3-8C. As illustrated, the method 1300 includes a number of enumerated blocks, but aspects of the method 1300 may include additional blocks before, after, and in between the enumerated blocks. In some aspects, one or more of the enumerated blocks may be omitted or performed in a different order.

At block 1310, the first communication device configures an encoder (e.g., encoder 606) with an encoder configuration. In some aspects, the encoder configuration may be based on information, e.g., in the form of a table, about the distortions, a change in task performance, or computing complexity (which affects computing delay and power consumption) for an encoder-decoder configuration for multiple pairs of sets of parameters (a pair consisting of a set of parameters for part 1 of the task network and a set of parameters for part 2 of the task network) based on predetermined testing representation (i.e., testing data), the network conditions (e.g., bit rate, error rate), and/or the performance requirements such as the time to complete the task. Decoder configuration may be likewise based on these metrics.

At block 1320, the first communication device selects a set of parameters for a first task network (e.g., task network 604) based on at least one of: the encoder configuration, or a decoder configuration associated with a second communication device.

At block 1330, the first communication device generates, via the first task network with the selected set of parameters, an intermediate representation of an input. The input may be, for example, an audio input, video input, image input, etc.

At block 1340, the first communication device generates, via the encoder, a compressed representation of the intermediate representation.

At block 1350, the first communication device transmits, to the second communication device, the compressed representation.

In some aspects, the first communication device receives, from the second communication device, an indication of the decoder configuration. In some aspects, the first communication device transmits, to the second communication device, an indication of the encoder configuration. In some aspects, the encoder configuration is based on an information including at least one of: a distortion level, a task performance level, a computing complexity level, a network condition, or a performance requirement. In some aspects, the information is received by the first communication device from at least one of: the second communication device or a network entity different from the second communication device.

Other aspects of the present disclosure include:
Aspect 1. A method of communication performed by a first communication device, the method comprising: generating, via a first task network, an intermediate representation of an input; generating, via an encoder configured with an encoder configuration, a compressed representation of the intermediate representation; transmitting, to a second communication device, the compressed representation; and transmitting, to the second communication device based on the encoder configuration, an indication for selecting a set of parameters for a second task network for generating an output based on the compressed representation.

Aspect 2. The method of aspect 1, wherein the indication includes a distortion level based on a difference between the intermediate representation and the compressed representation.

Aspect 3. The method of any of aspects 1-2, further comprising: generating, via a decoder, an uncompressed representation based on the compressed representation; generating, via the second task network configured with one or more sets of parameters, one or more outputs based on the uncompressed representation; and generating, via the second task network, a baseline output based on the intermediate representation, wherein the indication includes an indication of a change in task performance based on a comparison of the baseline output and the one or more outputs.

Aspect 4. The method of aspect 1, wherein the indication includes an indication of a specific set of parameters, and further comprising: selecting the specific set of parameters based on at least one of: a computed distortion level of the compressed representation, a computed change in task performance, a cost of swapping the second task network on the second communication device, a channel capacity between the first communication device and the second communication device, or a delay.

Aspect 5. The method of any of aspects 1-4, wherein the compressed representation and the indication are transmitted in-band within a same bitstream.

Aspect 6. The method of any of aspects 1-4, wherein the indication is transmitted out-of-band from the compressed representation.

Aspect 7. The method of any of aspects 1-6, wherein the generating the intermediate representation is performed using a depth of the first task network based on the encoder configuration, and wherein the indication is further for selecting a depth of the second task network.

Aspect 8. The method of any of aspects 1-7, wherein the encoder configuration includes at least one of: a feature reduction configuration, a quantization configuration, or a compression configuration.

Aspect 9. A method of communication performed by a first communication device, the method comprising: receiving, from a second communication device, an indication for parameter selection based on a predetermined testing representation; generating, via a first task network with a set of parameters selected based on the indication, an intermediate representation of an input; generating, via an encoder configured with an encoder configuration, a compressed representation of the intermediate representation; and transmitting, to the second communication device, the compressed representation.

Aspect 10. The method of aspect 9, wherein the indication includes an indication of a distortion level.

Aspect 11. The method of any of aspects 9-10, wherein the indication includes an indication of a change in task performance.

Aspect 12. The method of aspect 9, wherein the indication includes an indication of a specific set of parameters.

Aspect 13. The method of any of aspects 9-12, further comprising: configuring the encoder with a second encoder configuration based on the indication.

Aspect 14. The method of aspect 13, further comprising: transmitting, to the second communication device, an indication of the second encoder configuration.

Aspect 15. The method of any of aspects 13-14, wherein the encoder configuration includes at least one of: a feature reduction configuration, a quantization configuration, or a compression configuration.

Aspect 16. The method of any of aspects 9-15, wherein generating, the intermediate representation is performed using a depth of the first task network based on the indication.

Aspect 17. A method of communication performed by a first communication device, the method comprising: configuring an encoder with an encoder configuration; selecting a set of parameters for a first task network based on at least one of: the encoder configuration, or a decoder configuration associated with a second communication device; generating, via the first task network with the selected set of parameters, an intermediate representation of an input; generating, via the encoder, a compressed representation of the intermediate representation; and transmitting, to the second communication device, the compressed representation.

Aspect 18. The method of aspect 17, further comprising: receiving, from the second communication device, an indication of the decoder configuration; and transmitting, to the second communication device, an indication of the encoder configuration.

Aspect 19. The method of any of aspects 17-18, wherein the encoder configuration is based on an information including at least one of: a distortion level; a task performance level; a computing complexity level; a network condition; or a performance requirement.

Aspect 20. The method of aspect 19, further comprising: receiving the information from at least one of: the second communication device; or a network entity different from the second communication device.

Aspect 21. A network unit, comprising one or more memory devices and one or more processors in communication with the one or more memory devices, wherein the network unit is configured to perform the steps of any of aspects 1-20.

Aspect 22. A non-transitory, computer-readable medium having program code recorded therein, wherein the program code comprises instructions executable by one or more processors of a network unit to cause the network unit to perform the steps of any of aspects 1-20.

Aspect 23. A network unit comprising means for performing the steps of any of aspects 1-20.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other aspects and implementations are within the scope of the disclosure and appended claims. For instance, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for instance, a list of items prefaced by a phrase such as "at least one of" or "one or more of") indicates an inclusive list such that, for instance, a list of [at least one of A, B, or C] means A or B or C or AB or AC or BC or ABC (e.g., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular aspects illustrated and described herein, as they are merely by way of some aspects thereof, but rather, should be fully commensurate with that of the claims appended hereafter and their functional equivalents.

What is claimed is:

1. A method of communication performed by a first communication device, the method comprising:
   generating, via a first task network, an intermediate representation of an input;
   generating, via an encoder configured with an encoder configuration, a compressed representation of the intermediate representation;
   transmitting, to a second communication device, the compressed representation; and
   transmitting, to the second communication device based on the encoder configuration, an indication for selecting a set of parameters for a second task network for generating an output based on the compressed representation.

2. The method of claim 1, wherein the indication includes a distortion level based on a difference between the intermediate representation and the compressed representation.

3. The method of claim 1, further comprising:
   generating, via a decoder, an uncompressed representation based on the compressed representation;
   generating, via the second task network configured with one or more sets of parameters, one or more outputs based on the uncompressed representation; and
   generating, via the second task network, a baseline output based on the intermediate representation,
   wherein the indication includes an indication of a change in task performance based on a comparison of the baseline output and the one or more outputs.

4. The method of claim 1, wherein the indication includes an indication of a specific set of parameters, and further comprising:
   selecting the specific set of parameters based on at least one of:
      a computed distortion level of the compressed representation,
      a computed change in task performance,
      a cost of swapping the second task network on the second communication device,
      a channel capacity between the first communication device and the second communication device, or
      a delay.

5. The method of claim 1, wherein the compressed representation and the indication are transmitted in-band within a same bitstream.

6. The method of claim 1, wherein the indication is transmitted out-of-band from the compressed representation.

7. The method of claim 1,
   wherein the generating the intermediate representation is performed using a depth of the first task network based on the encoder configuration, and
   wherein the indication is further for selecting a depth of the second task network.

8. The method of claim 1, wherein the encoder configuration includes at least one of:
   a feature reduction configuration,
   a quantization configuration, or
   a compression configuration.

9. A method of communication performed by a first communication device, the method comprising:
   receiving, from a second communication device, an indication for parameter selection based on a predetermined testing representation;
   generating, via a first task network with a set of parameters selected based on the indication, an intermediate representation of an input;
   generating, via an encoder configured with an encoder configuration, a compressed representation of the intermediate representation; and
   transmitting, to the second communication device, the compressed representation.

10. The method of claim 9, wherein the indication includes an indication of a distortion level.

11. The method of claim 9, wherein the indication includes an indication of a change in task performance.

12. The method of claim 9, wherein the indication includes an indication of a specific set of parameters.

13. The method of claim 9, further comprising:
    configuring the encoder with a second encoder configuration based on the indication.

14. The method of claim 13, further comprising:
    transmitting, to the second communication device, an indication of the second encoder configuration.

15. The method of claim 13, wherein the encoder configuration includes at least one of:
    a feature reduction configuration,
    a quantization configuration, or
    a compression configuration.

16. The method of claim 9, wherein generating, the intermediate representation is performed using a depth of the first task network based on the indication.

17. A method of communication performed by a first communication device, the method comprising:
    configuring an encoder with an encoder configuration;
    selecting a set of parameters for a first task network based on at least one of:
       the encoder configuration, or
       a decoder configuration associated with a second communication device;
    generating, via the first task network with the selected set of parameters, an intermediate representation of an input;
    generating, via the encoder, a compressed representation of the intermediate representation; and transmitting, to the second communication device, the compressed representation.

18. The method of claim 17, further comprising:
receiving, from the second communication device, an indication of the decoder configuration; and
transmitting, to the second communication device, an indication of the encoder configuration.

19. The method of claim 17, wherein the encoder configuration is based on an information including at least one of:
a distortion level;
a task performance level;
a computing complexity level;
a network condition; or
a performance requirement.

20. The method of claim 19, further comprising:
receiving the information from at least one of:
the second communication device; or
a network entity different from the second communication device.

* * * * *